US010682970B2

(12) United States Patent
Gheorghe

(10) Patent No.: US 10,682,970 B2
(45) Date of Patent: Jun. 16, 2020

(54) SHOCK ABSORPTION DEVICE

(71) Applicant: Sorin Gheorghe, Auckland (NZ)

(72) Inventor: Sorin Gheorghe, Auckland (NZ)

(*) Notice: Subject to any disclaimer, the term of this patent is extended or adjusted under 35 U.S.C. 154(b) by 390 days.

(21) Appl. No.: 15/740,833

(22) PCT Filed: Jul. 1, 2016

(86) PCT No.: PCT/NZ2016/050107
§ 371 (c)(1),
(2) Date: Dec. 29, 2017

(87) PCT Pub. No.: WO2017/007339
PCT Pub. Date: Jan. 12, 2017

(65) Prior Publication Data
US 2018/0361966 A1 Dec. 20, 2018

(30) Foreign Application Priority Data
Jul. 6, 2015 (NZ) .................................. 709749

(51) Int. Cl.
*B60R 19/20* (2006.01)
*F16F 15/08* (2006.01)
(Continued)

(52) U.S. Cl.
CPC ............ *B60R 19/20* (2013.01); *B60R 19/023* (2013.01); *B60R 19/36* (2013.01); *F16F 15/085* (2013.01);
(Continued)

(58) Field of Classification Search
CPC ....... B60R 19/20; B60R 19/023; B60R 19/36; B60R 19/34; B60R 19/40;
(Continued)

(56) References Cited

U.S. PATENT DOCUMENTS 1,691,398 A 11/1928 Long
2,905,458 A 9/1959 Mason
(Continued)

FOREIGN PATENT DOCUMENTS

RO 123126 11/2010

OTHER PUBLICATIONS

Bumper Axial Type-Low Load or High Load; Bumper: High-Performance Elastomer-Polyester.
(Continued)

*Primary Examiner* — Robert A. Siconolfi
*Assistant Examiner* — San M Aung
(74) *Attorney, Agent, or Firm* — Young & Thompson

(57) ABSTRACT

A shock absorption device includes an inner cylinder assembly threadably engaged within an outer cylinder assembly. The outer cylinder assembly includes a cap shaped member, at least one protruding member, and at least one first spring member. The inner cylinder assembly includes at least one compressive member, at least one second spring member, and at least one movable piston member. When an external impact force is applied to the cap shaped body member, the first threaded portion of the outer cylinder assembly jumps over the second threaded portion of the inner cylinder assembly as provided by elastic movement of the resilient ring member about the cap shaped body member. The thread jumping results in the first spring member compressing and the protruding member pushing the piston member which pushes and compresses the second spring member and the compressive member providing a reactive force to absorb the external impact force.

32 Claims, 15 Drawing Sheets

US 10,682,970 B2
Page 2

(51) Int. Cl.
  *B60R 19/02* (2006.01)
  *B60R 19/36* (2006.01)

(52) U.S. Cl.
  CPC ... *F16F 2230/0041* (2013.01); *F16F 2230/24* (2013.01)

(58) Field of Classification Search
  CPC ......... B60R 2019/262; B60R 2021/343; F16F 15/085; F16F 2230/0041; F16F 2230/24; F16F 7/125; F16F 7/126; B21D 28/20; B21D 7/00; F16H 25/2252
  USPC ....... 188/266, 134, 271, 272, 378, 231, 371, 188/372; 267/130, 137; 293/117, 132, 293/102; 340/435
  See application file for complete search history.

(56) References Cited

U.S. PATENT DOCUMENTS

| | | | |
|---|---|---|---|
| 3,333,880 A | 8/1967 | Tavano | |
| 3,360,080 A * | 12/1967 | Platus | F16F 7/125 188/372 |
| 3,806,105 A | 4/1974 | Knoishi et al. | |
| 3,947,058 A * | 3/1976 | Laporte | B60R 22/28 297/470 |
| 4,186,569 A | 2/1980 | Aumann | |
| 4,786,459 A * | 11/1988 | Mundo | B60R 19/26 188/134 |
| 4,877,226 A | 10/1989 | Taylor | |
| 8,157,067 B2 * | 4/2012 | Ruthinowski | B60N 2/2809 188/372 |
| 8,246,019 B2 | 8/2012 | Krajenke | |
| 2005/0189187 A1 * | 9/2005 | Leung | B60R 19/26 188/371 |
| 2011/0172054 A1 * | 7/2011 | Jabusch | B60R 19/36 475/331 |
| 2011/0291338 A1 | 12/2011 | Pepka | |

OTHER PUBLICATIONS

Zimmer; Industrial Shock Absorber, Resources: Dampening Characteristics, 2012—Intercon Automation Parts Inc.
International Search Report, PCT/NZ2016/050107, dated Dec. 28, 2016.
Written Opinion, PCT/NZ2016/050107, dated Dec. 28, 2016.

* cited by examiner

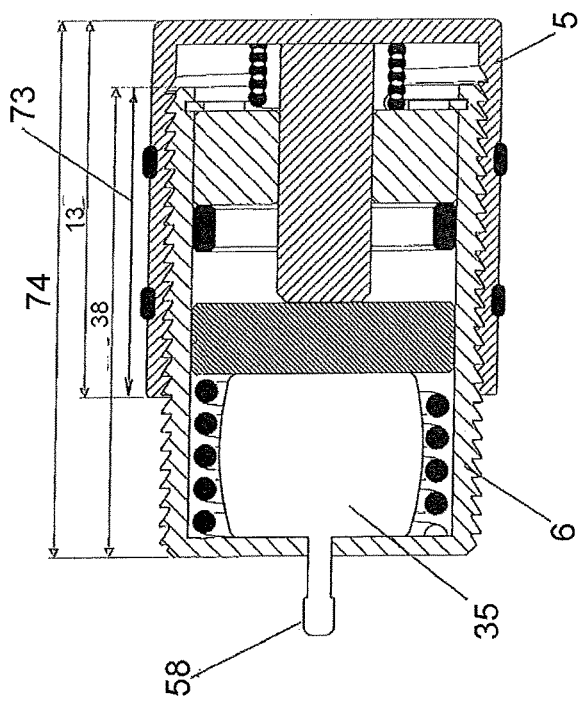
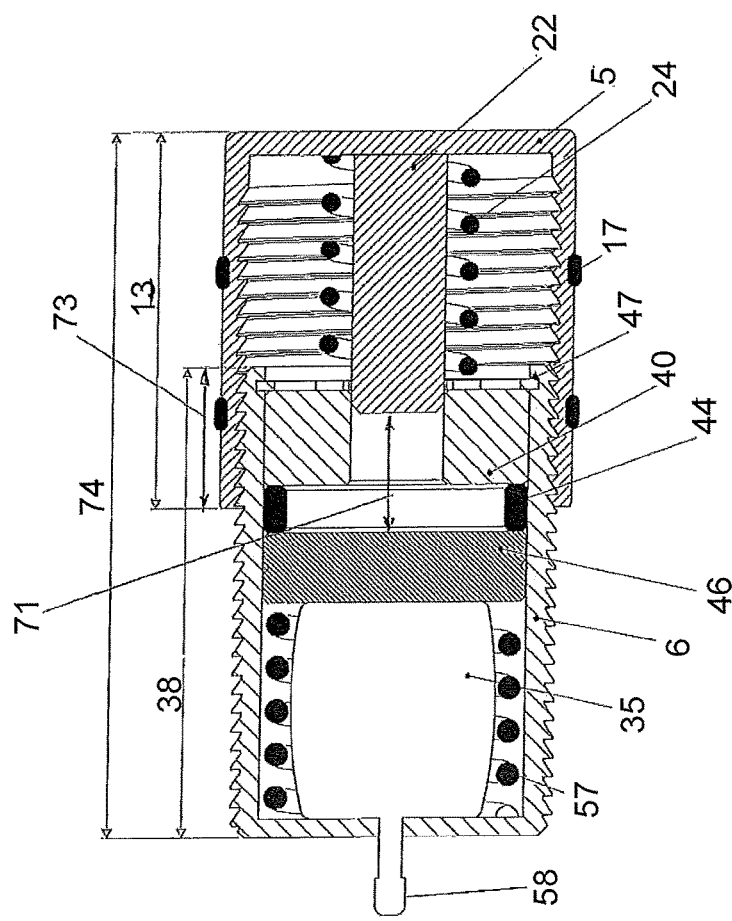
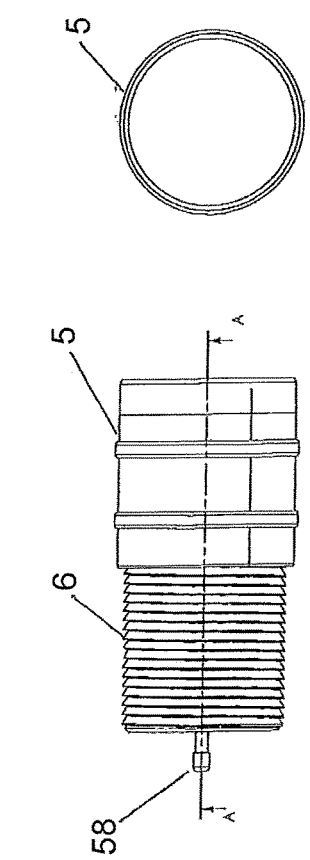
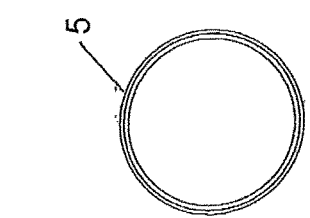

SHOCK ABSORPTION DEVICE

FIELD OF THE INVENTION

The present invention relates to a shock absorption device for preventing damage to an object or structure, and to methods of assembly and utilization. The invention is directed particularly but not solely towards a shock absorption device for vehicles to reduce the impact of any collision and damage.

BACKGROUND OF INVENTION

Wikipedia defines that the traffic collision, also known as a motor vehicle collision (MVC), traffic accident, motor vehicle accident, car accident, automobile accident, road traffic collision, road traffic accident, wreck, car crash, or car smash, occurs when a vehicle collides with another vehicle, pedestrian, animal, road debris, or stationary obstruction, such as a tree or utility pole. Traffic collisions may result in injury, death, vehicle damage, or/and property damage (https://en.wikipedia.org/wiki/traffic collision).

As per Annual Global Road Crash Statistics, (http://asirt.org/Initiatives/Informing-Road-Users/Road-Safety-Facts/Road-Crash-Statistics):

Nearly 1.3 million people die in road crashes each year, on average 3,287 deaths a day.
An additional 20-50 million are injured or disabled.
Road traffic crashes rank as the 9th leading cause of death and account for 2.2% of all deaths globally.
Road crashes are the leading cause of death among young people ages 15-29, and the second leading cause of death worldwide among young people ages 5-14.
Each year nearly 400,000 people under 25 die on the world's roads, on average over 1,000 a day.
Unless action is taken, road traffic injuries are predicted to become the fifth leading cause of death by 2030.
Collisions between objects cause damage every day.
These collisions happen when a moving object collides with another moving object like:
(a) Vehicles that collides with another vehicle (i.e., car, bus, truck, motorcycle, van, bike, wheelchairs, animals, humans etc.)
(b) Aircraft that collides with another aircraft
(c) Vessel that collides with another vessel
(d) Train that collides with another train
(e) Elevator that collides with another elevator Collisions also happen when a moving object rams into another non-moving object like:
(a) Vehicle that rams into a tree, a post, a fence, a house, a building, etc.
(b) Aircraft that rams into a field, a building, a house, water, a tree, etc.
(c) Vessel that rams into a rock, an iceberg, a light house, etc.
(d) Train that rams into a wall, a post, a person, etc.
(e) Elevator that rams into the building floor Any of these objects can collide or be hit by other objects, causing damage which has many, flow on effects such as cost of repair, insurance, health problems including death and time off work. These, flow on effects can be very costly to the individual and country.

In this specification unless the contrary is expressly stated, where a document, act or item of knowledge is referred to or discussed, this reference or discussion is not an admission that the document, act or item of knowledge or any combination thereof was at the priority date, publicly available, known to the public, part of common general knowledge; or known to be relevant to an attempt to solve any problem with which this specification is concerned.

OBJECT OF THE INVENTION

It is an object of the invention to provide a shock absorption device and methods that ameliorates some of the disadvantages and limitations of the known art or at least provide the public with a useful choice.

SUMMARY OF INVENTION

In a first aspect, the invention resides in a shock absorption device 1 for a surrounding or abutting structure which includes an outer cylinder assembly and an inner cylinder assembly, the outer cylinder assembly includes a cap shaped body member 5 which includes at least one elongated slit 16, with at least one width or gap 18, at least one exterior circumferential groove 17a, at least one first threaded portion 19 and having a hollow space therein which includes at least one protruding member 22, at least one first spring member 24 at least one resilient ring member 17 which is provided to outwardly encircle an exterior curved wall surface 20 of the cap shaped body member 5, the inner cylinder assembly includes a cylindrical shaped body member 6 which includes at least one second threaded portion 37 and having a hollow space therein which includes at least one compressive member 56, at least one second spring member 57, at least one movable piston member 46, the inner cylinder assembly is threadably engaged within the outer cylinder assembly whereby the first threaded portion 19 threadably engages with the second threaded portion 37, wherein when an external impact force F1 is applied to the cap shaped body member 5, the first threaded portion 19 jumps over the second threaded portion 37 as provided by elastic movement of the resilient ring member 17 about the cap shaped body member 5 which allows the first threaded portion 19 of the cap shaped body member 5 to jump over the second threaded portion 37 of the cylindrical shaped body member 6 when an external impact force F1 is applied, to allow one way movement only, the first spring member 24 is compressed, the protruding member 22 pushes the piston member 46, the piston member 46 pushes and compresses the second spring member 57 and the compressive member 56 which when relaxed are providing a reactive force F2 to cause the absorption of the external impact force F1 in such a way that the shock absorption device 1 is locked in a random position when F2=F1, whereby the outer cylinder assembly and the inner cylinder assembly are not able to disengage with respect to each other.

Preferably, the cap shaped body member 5 of the outer cylinder assembly has a cylindrical body shape with a base end 7, an open end 10, a hollow interior space 9, an exterior length 13, an exterior diameter 14, an interior end surface 12, an exterior curved side walls 8, an exterior curved wall surface 20 and an interior curved wall surface 11 having the first threaded portion 19 located therein.

Preferably, the cylindrical shaped body member 6 of the inner cylinder assembly has a cylindrical body shape with a base end 32, an open end 31, an exterior length 38, an exterior diameter 39, an interior end surface 52, an exterior curved side walls 33, an interior curved wall surface 36 and an exterior curved wall surface 30 having the second threaded portion 37 there around.

Preferably, the at least one resilient ring member 17 is located in an at least one exterior circumferential groove 17a in the exterior curved wall surface 20 of cap shaped body member 5 and wherein the elongated slit 16 has a longitudinal axis parallel with a longitudinal axis 15 defining a length of the shock absorption device 1 and the resilient ring member 17 has an axis in a transverse direction defining a width, with regard to the longitudinal axis 15 of the shock absorption device 1.

Preferably, the protruding member 22 and the first spring member 24 are located adjacent each other, inside the hollow interior space 9 of the cap shaped body member 5, the protruding member 22 extends through the open end 10 of the cap shaped body member 5 and protrude 22 includes a body with the same length, shorter in length or longer in length with respect to the length of the cap shaped body member 5 wherein a distal end called a body end face 70 of the protruding member 22 is recessed with respect to an entry open end 31 of the cylindrical shaped body member 6.

Preferably, in a first option, the compressive member 56 is a cylindrical high performance elastomer polyester (HPEP) member.

Alternatively, in a second option, the compressive member 56 can be replaced with a sealed pressure chamber 35.

Alternatively, in a third option, the compressive member 56 can be replaced with a sealed pressure membrane 34.

Preferably, in the first option, the compressive member 56 is located inside the hollow interior space of the cylindrical shaped body member 6, adjacent with the second spring member 57, with an inner planar surface 50 of the piston member 46, with the interior curved wall surface 36 and with an interior end surface 52 of the cylindrical shaped body member 6.

Alternatively, in the second option, the sealed pressure membrane 35 is located inside the hollow interior space of the cylindrical shaped body member 6, adjacent with the second spring member 57, with an inner planar surface 50 of the piston member 46, with the interior curved wall surface 36 and an interior end surface 52 of the cylindrical shaped body member 6.

Alternatively, in the third option, the cylindrical shaped body member 6 has a hollow enclosed interior space inside, therein the hollow enclosed interior space defines a cylindrical volumetric space or sealed pressure chamber 34, located adjacent with the second spring member 57, with the inner planar surface 50 of the piston member 46, with the interior curved wall surface 36 and with the interior end surface 52 of the cylindrical shaped body member 6.

Preferably, in the first option, when using the compressive member 56, the cylindrical shaped body member 6 of the inner cylinder assembly includes at least one interior circumferential groove 47a, for the removable location of a spacer ring member 44.

Alternatively, in the second option, when using the sealed pressure membrane 35 or in the third option, when using the sealed pressure chamber 34, the cylindrical shaped body member 6 of the inner cylinder assembly includes at least one interior circumferential groove 47a and at least one base valve 58.

Preferably, the inner cylinder assembly includes the following components of at least one guide member 40, located adjacent with the first spring member 24, with at least one clip member 47, with at least one spacer ring member 44, with at least one piston member 46 wherein the guide member 40 is provided with a body with a curved side surfaces 41, an outer planar surface 42, an inner planar surface 43, with at least one aperture 45 extended from the outer planar surface 42 to the inner planar surface 43 defining a thickness, the curved side surfaces 41 of the guide member 40 are in use slidably abutting the interior curved wall surface 36 of the cylindrical shaped body member 6, wherein when in use the guide member 40 allows to at least a portion of the protruding member 22 there through, wherein the protruding member 22 moves within a certain distance 71 before hitting the piston member 46 and if the external impact force F1 is too low, the device will not be activated to cause movement between the outer and inner cylinder assemblies.

Preferably, the at least one spacer ring member 44, is located between the guide member 40, with the piston member 46, which are located adjacent the protruding member 22 at the open end 31 of the cylinder shaped member 6.

Preferably, the at least one piston member 46, is located between the spacer ring member 44, and the second spring member 57 and the second spring member 57 encircles the compressive member 56, wherein the piston member 46 is provided with a body with a curved side surface 54, an outer planar surface 49, an inner planar surface 50, wherein in the first option, when using the compressive member 56, the piston member 46 comprises a circular solid shaped disc member.

Alternatively, in the second option, when using the sealed pressure membrane 35, the piston member 46 comprises a circular solid shaped disc member and the second spring member is located outside of the sealed pressure membrane 35.

Alternatively, in the third option, when using a sealed pressure chamber 34, the piston member 46 comprises a circular shaped disc member with at least one aperture 53 there through for at least one piston valve 55 therein, wherein the piston valve 55 when in use functions is to provide an exit of any excess fluid pressure from within the sealed pressure chamber 34.

Preferably the guide member 40 is located between the at least one clip member 47 and at least one spacer ring member 44.

Preferably, at least one clip member 47 is movably located in the at least one interior circumferential groove 47a which is provided inside the first end 31 of the cylindrical shaped body member 6, the clip member 47 is located adjacent with the guide member 40, with the first spring member 24, with the protruding member 22, wherein the clip member 47 can be a circlip and functions to removably hold all the components, which can include the compressive member 56, the second spring member 57, the piston member 46, the spacer ring member 44 and the guide member 40 of the inner cylinder assembly.

Preferably, at least one second spring member 57 is movably located adjacent with the compressive member 56, with the piston member 46, wherein the second spring member 57 functions is to hold or position the piston member 46 of the inner cylinder assembly, wherein the second spring member 57 is positioned to abut the base interior end surface 52 of the cylindrical shaped body member 6 and an inner planar surface 50 of the piston member 46, wherein the second spring member 57 together with the compressive member 56 assist in increasing the reactive force F2.

Preferably, the first spring member 24 and the second spring member 57 are rectangular or circular in cross section.

Preferably, in the first option, when using the compressive member 56, the piston member 46 comprises a circular solid shaped disc member with no apertures, sized and shaped to slidably interfit inside the cylindrical shaped body member 6, the piston member 46 having an outer planar surface 49, an inner planar surface 50 and a curved side surface 54 wherein in use, the curved side surface 54 of the piston member 46 slidably abuts the interior curved wall surface 36 of the cylindrical shaped body member 6.

Alternatively, in the second option, when using the sealed pressure membrane 35, the piston member 46 comprises a circular solid shaped disc member with no apertures.

Alternatively, in the third option, when using the sealed pressure chamber 34, the piston member 46 has a circular shaped disc member with at least one aperture 53 there through for at least one piston valve 55 therein, wherein the piston valve 55 functions is to provide an exit of any excess fluid pressure from within the sealed pressure chamber 34.

Preferably, in the first option, when using the compressive member 56 there is no fluid under pressure inside the inner cylinder assembly and the cylindrical shaped body member 6 of the inner cylinder assembly has no inlet or outlet or base valves.

Alternatively, in the second option, when using the sealed pressure membrane 35, the fluid under pressure is inside the sealed pressure membrane 35 of the inner cylinder assembly and the cylindrical shaped body member 6 of the inner cylinder assembly includes at least one base valve 58 which is connected with the sealed pressure membrane 35, the base valve 58 is positioned between an end wall or base end 32 and the inner end surface 52, wherein the base valve 58 functions is to provide a one way entry aperture for filling the sealed pressure membrane 35 with the fluid contained, therein.

Alternatively, in the third option, the cylindrical shaped body member 6 has a hollow enclosed interior space inside, therein the hollow enclosed interior space defines a cylindrical volumetric space or sealed pressure chamber 34, bordered by an interior curved wall surface 36 being a pressurized volume adapted to retain a fluid under pressure therein. For a constant pressure of the fluid inside the sealed pressure chamber 34, the outer planar surface 49 of the piston member 46 including the piston valves 55 (the outer surface 63 of the valve head 60), are coated or laminated with a flexible resilient membrane 69, the coating or lamination can be done with resilient materials such as for example silicone or rubber. When using the sealed pressure chamber 34, the piston member 46 of the cylindrical shaped body member 6 of the inner cylinder assembly includes at least one base valve 58 which is located and positioned in an end wall or base end 32 wherein the base valve 58 functions is to provide a one way entry aperture for filling the sealed pressure chamber 34 with the fluid contained, therein.

Preferably, the first threaded portion 19 and the second threaded portion 37 are shaped and oriented to have a forward angled degree angle and a further forward 90 degree angle as shown in FIG. 2, with the resilient ring member 17 and the elongated slits 16, whereby initial movement between the outer cylinder assembly and the inner cylinder assembly is the only one way elastic movement, whereby the external impact force F1 pushes the cap shaped body member 5 of the outer cylinder assembly, to cause the first threaded portion 19 to jump over the second threaded portion 37 of the cylindrical shaped body member 6 of the inner cylinder assembly.

Preferably, the length of the cylindrical shaped body member 6 of the inner cylinder assembly is longer than the length of the cap shaped body member 5 of the outer cylinder assembly, having an exterior length 38 commensurate with a longitudinal axis 15 of the shock absorption device 1 and an exterior diameter 39, also having a transverse axis located at right angles to the longitudinal axis 15 of the shock absorption device 1.

Preferably, the outer cylinder assembly can be threadingly engaged or disengaged with respect to the inner cylinder assembly to create an overlap length 74 there between the first threaded portion 19 and the second threaded portion 37, wherein the shock absorption device 1 is ready for use when there is a certain distance 71 between the protruding member 22 and the piston member 46.

Preferably the inner surface shape of the cap shaped body member 5 and the outer surface shape of the cylindrical shaped body member 6 are similar thereby enabling them to be threadingly engagable.

In a second aspect, the invention resides in a method of assembly of a shock absorption device 1 for a structure, wherein the method includes the following steps:

Step 1—Evaluate and calculate an external impact force F1 wherein the external impact force F1 can be calculated depending on the speed of the vehicle, on the weight of the vehicle, etc.;

Step 2—In the first option, when using the compressive member 56, the fluid pressure does not exist;

Step 2.1—Alternatively, in the second option, when using the sealed pressure membrane 35, calculate the pressure of the fluid from inside the sealed pressure membrane 35, according to the external impact force F1;

Step 2.2—Alternatively, in the third option, when using the sealed pressure chamber 34, calculate the pressure of the fluid from the sealed pressure chamber 34 according to the external impact force F1;

Step 3—In the first option, when using a compressive member 56, calculate the dimensions of the compressive member 56, according to the external impact force F1;

Step 3.1—Alternatively, in the second option, when using a sealed pressure membrane 35, calculate the dimensions of the sealed pressure membrane 35, according to the external impact force F1;

Step 3.2—Alternatively, in the third option, when using a sealed pressure chamber 34, calculate the dimensions of the sealed pressure chamber 34, according to the external impact force F1;

Step 4—Calculate the dimensions of the first spring member 24 and the second spring member 57, according to the external impact force F1;

Step 5—Calculate the dimensions of the first threaded portion 19 and the second threaded portion 37, according to the external impact force F1;

Step 6—Form and provide the outer cylinder assembly, which includes a cap shaped body member 5 consisting of at least one elongated slit 16, at least one exterior circumferential groove 17a, a first threaded portion 19 and a protruding member 22, a first spring member 24 at least one resilient ring member 17;

Step 7—Assemble the outer cylinder assembly: inside the cap shaped body member 5 fix the protruding member 22, add the first spring member 24 located around the protruding member 22 and add the resilient ring member 17 in the exterior circumferential groove 17a located outside the cap shaped body member 5 on the exterior curved wall surface 20;

Step 8—In the first option, when using a compressive member 56, form and provide the inner cylinder assembly, which includes a cylindrical shaped body member 6 consisting of a second threaded portion 37, an interior circumferential groove 47a and a guide member 40, a spacer ring member 44, a piston member 46, a second spring member 57, a clip member 47, a compressive member 56;

Step 8.1—Alternatively, in the second option, when using a sealed pressure membrane 35, form and provide the inner cylinder assembly, which includes a cylindrical shaped body member 6 consisting of a second threaded portion 37, an opening for the base valve 58, an interior circumferential groove 47a and a guide member 40, a spacer ring member 44, a piston member 46, a second spring member 57, a clip member 47, a sealed pressure membrane 35;

Step 8.2—Alternatively, in the third option, when using a sealed pressure chamber 34, form and provide the inner cylinder assembly, which includes a cylindrical shaped body member 6 consisting of a second threaded portion 37, an opening for the base valve 58 and an interior circumferential groove 47a, a guide member 40, a spacer ring member 44, a piston member 46, a second spring member 57, a clip member 47, a sealed pressure chamber 34;

Step 9—In the first option, when using a compressive member 56, assemble the inner cylinder assembly: inside the cylindrical shape body member 6 add the second spring member 57, add the compressive member 56 adjacent with the second spring member 57;

Step 9.1—Alternatively, in the second option, when using a sealed pressure membrane 35, assemble the inner cylinder assembly: inside the cylindrical shape body member 6 add the second spring member 57, add the sealed pressure membrane 35 and fix the base valve 58 to the base end 32 of the cylindrical shaped body member 6;

Step 9.2—Alternatively, in the third option, when using a sealed pressure chamber 34, assemble the inner cylinder assembly: inside the cylindrical shape body member 6 add the second spring member 57, add the sealed pressure chamber and fix the base valve 58 to the base end 32 of the cylindrical shaped body member 6;

Step 10—Next add the piston member 46;

Step 11—Alternatively, in the third option, when using a sealed pressure chamber 34, optionally seal, laminate or coat the whole piston member outside surface 49, including the surface of the piston valves 55 with a flexible resilient membrane 69;

Step 12—Add the spacer ring member 44, then add the guide member 40 and finally add the clip member 47 in the interior circumferential groove 47a;

Step 13—In the first option, when using the compressive member 56 there are no fluid under pressure and no base valve 58

Step 13.1—Alternatively, in the second option, when using the sealed pressure membrane 35 or in the third option, when using the sealed pressure chamber 34, insert the fluid inside the sealed pressure membrane 35 or inside the sealed pressure chamber 34 through the base valve 58 at a certain pressure, calculated at Step 2;

Step 14—Assemble the shock absorption device 1 to be ready for mounting: screw a small portion of the first threaded portion 19 of the outer cylinder assembly to a small portion of the second threaded portion 37 of the inner cylinder assembly, so that at least a portion of the protruding member 22 is going through the aperture 45 of the guide member 40 and an end of the first spring member 24 is located on the outer planar surface 42 of the guide member 40 to be in an non activated position, with a certain overlap portion 73 between the outer cylinder assembly and the inner cylinder assembly, then mount the shock absorption device 1 on any place (surface) of the vehicle;

Step 15—The shock absorption device 1 is ready for use by being in a non-activated position, whereby the external force F1 can be applied.

In a third aspect, the invention resides in method of utilizing a shock absorption device 1 for a structure, wherein the method includes the following steps:

Step 1—The shock absorption device 1 is first assembled in a non-activated position, when there is a set distance 71 between the body end face 70 of the protruding member 22 and the piston member 46, with a certain overlap 73 between the outer cylinder assembly and the inner cylinder assembly;

Step 2—An external impact force F1 is applied to the surface of the base end 7 of the cap shaped body member 5 of the outer cylinder assembly;

Step 3—The first threaded portion 19 jumps over the second threaded portion 37 and the protruding member 22 moves through the aperture 45 of the guide member 40, until the distance 71 between the body end face 70 of the protruding member 22 and the outer planar surface 49 of the piston member 46 is closed;

Step 4—In the first option, when using the compressive member, further, because of the application of the external impact force F1, the body end face 70 of the protruding member 22 pushes the outer planar surface 49 of the piston member 46 that pushes and compresses the second spring member 57 and the compressive member 56;

Step 4.1—Alternatively, in the second option, when using the sealed pressure membrane 35, or in the third option, when using the sealed pressure chamber, because of the application of the external impact force F1, the body end face 70 of the protruding member 22 pushes the outer planar surface 49 of the piston member 46 that pushes and compresses the second spring member 57 and the fluid under pressure from the sealed pressure membrane 35 or from the sealed pressure chamber 34, Step 5—In the first option, when using the compressive member 56, the second spring member 57 and the compressive member 56 will relax and together will provide a reactive force F2;

Step 5.1—Alternatively, in the second option, when using a sealed pressure membrane 35, the second spring member 57 and the compressed fluid under pressure from the sealed pressure membrane 35 will relax and together will provide a reactive force F2;

Step 5.2—Alternatively, in the third option, when using a sealed pressure chamber 34, the second spring member 57 and the compressed fluid under pressure from the sealed pressure chamber 34 will relax and together will provide a reactive force F2, while the fluid under pressure from the sealed pressure chamber 34 will be evacuated or discharged through the piston valves 55;

Step 6—The reactive force F2 will increase and will push back the piston member 46 and also the protruding member 22 and the first spring member 24;

Step 7—When the reactive force F2 equalizes the external impact force F1 (F2=F1), the shock absorption device 1 will be locked in a certain position;

Step 8—By simply unscrewing the outer cylinder assembly and the inner cylinder assembly, the shock absorption device 1 will return to its original position or non-activated position, in order to be reused.

BRIEF DESCRIPTION

The invention will now be described, by way of example only, by reference to the accompanying drawings:

FIG. 1 is a perspective view in accordance with one preferred embodiment of the invention of a shock absorption device 1 which includes an outer cylinder assembly and an inner cylindrical assembly, in the first option, when using the compressive member 56.

FIG. 1A is a perspective view in accordance with one preferred embodiment of the invention of a shock absorption device 1 which includes an outer cylinder assembly and an inner cylindrical assembly, in the second option, when using the sealed pressure membrane 35, or in the third option, when using the sealed pressure chamber 34.

FIG. 2 is a partial cross section of the shock absorption device 1 in the third option, when using the sealed pressure chamber 34.

FIG. 3 is a perspective schematic view of the outer cylinder assembly.

FIG. 3A is a perspective view similar to FIG. 3.

FIG. 4 is a perspective schematic view of the inner cylinder assembly in the first option, when using the compressive member 56.

FIG. 4A is a perspective schematic view of the inner cylinder assembly in the second option, when using the sealed pressure membrane 35, or in the third option, when using the sealed pressure chamber 34.

FIG. 5 is a side view of the cap shaped body member 5.

FIG. 6 is an end view of the cap shaped body member 5 of FIG. 5.

FIG. 7 is a cross section view of a guide member 40.

FIG. 8 is an end view of the guide member 40 of FIG. 7.

FIG. 9 is a cross section view of a piston member 46 in the first option, when using the compressive member 56 and for the second option, when using the sealed pressure membrane 35.

FIG. 10 is an end view of the piston member 46 of FIG. 9.

FIG. 11 is a cross section view of another piston member 46 in the third option, when using the sealed pressure chamber 34.

FIG. 12 is an end view of the piston member 46 of FIG. 11.

FIG. 13 is a schematic cross sectional side view of the piston valve 55 in the third option, when using the sealed pressure chamber 34.

FIG. 14 is a partial cross section of the shock absorption device 1 in the second option, when using the sealed pressure membrane 35.

FIG. 14A is a partial perspective view of the shock absorption device showing an inside view similar to FIG. 14.

FIG. 15 is perspective view in the first option, when using the compressive member 56.

FIG. 16 is a partial cross section of the shock absorption device 1 in the first option, when using the compressive member 56.

FIG. 16A is a partial perspective view of the shock absorption device showing an inside view similar to FIG. 16.

FIG. 17 is another perspective view of the shock absorption device 1 in the second option when using the sealed pressure membrane 35.

FIG. 18 is a side view of the shock absorption device 1 of FIG. 17 showing position of section A-A.

FIG. 19 is a right end view of the shock absorption device 1 of FIG. 17.

FIG. 20 is a cross sectional side view section A-A of the shock absorption device 1 of FIG. 17 in a mainly non compressed state.

FIG. 21 is a cross sectional side view section A-A of the shock absorption device 1 of FIG. 17 in a compressed state.

FIG. 22 is another perspective view of the shock absorption device 1 in the first option, when using the compressive member 56.

FIG. 23 is a side view of the shock absorption device 1 of FIG. 22 showing position of section A-A.

FIG. 24 is a right end view of the shock absorption device 1 of FIG. 22.

FIG. 25 is a cross sectional side view section A-A of the shock absorption device 1 of FIG. 22 in a mainly non compressed state.

FIG. 26 is a cross sectional side view section A-A of the shock absorption device 1 of FIG. 22 in a compressed state.

DESCRIPTION OF DRAWINGS

The following description will describe the invention in relation to preferred embodiments of the invention, namely a shock absorption device 1. The invention is in no way limited to these preferred embodiments as they are purely to exemplify the invention only and that possible variations and modifications would be readily apparent without departing from the scope of the invention.

FIGS. 1-26 show the shock absorption device 1 which includes an outer cylinder assembly and an inner cylinder assembly.

The Outer Cylinder Assembly

Figure 1:
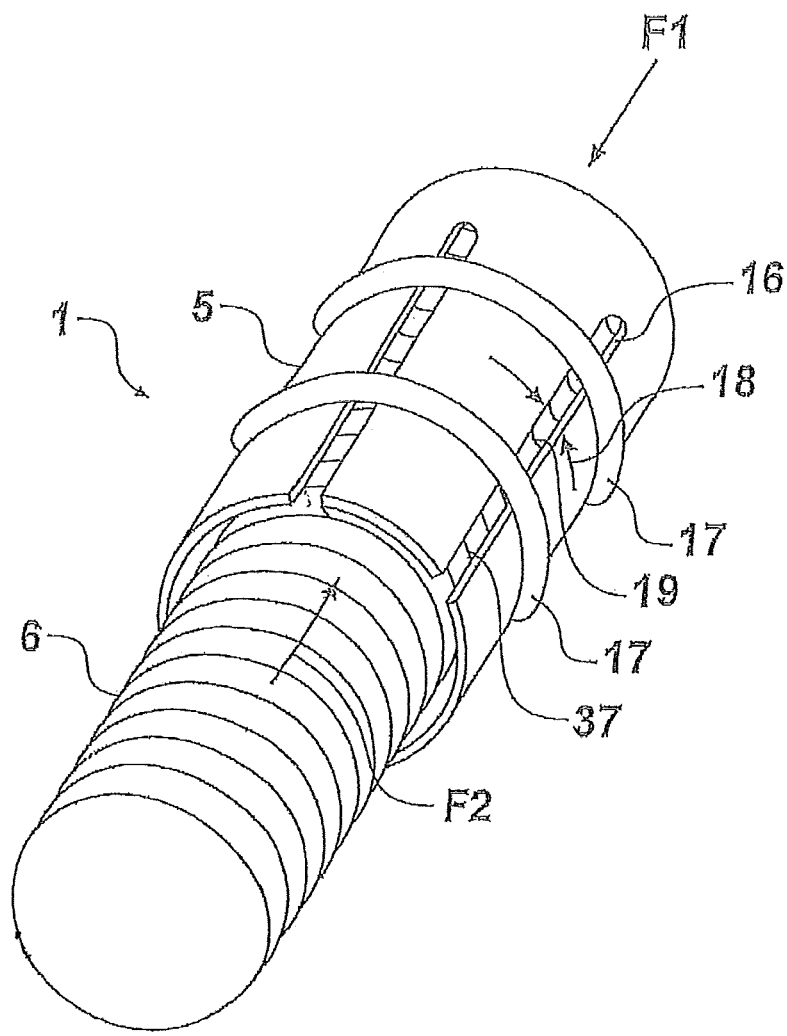
Figure 1A:
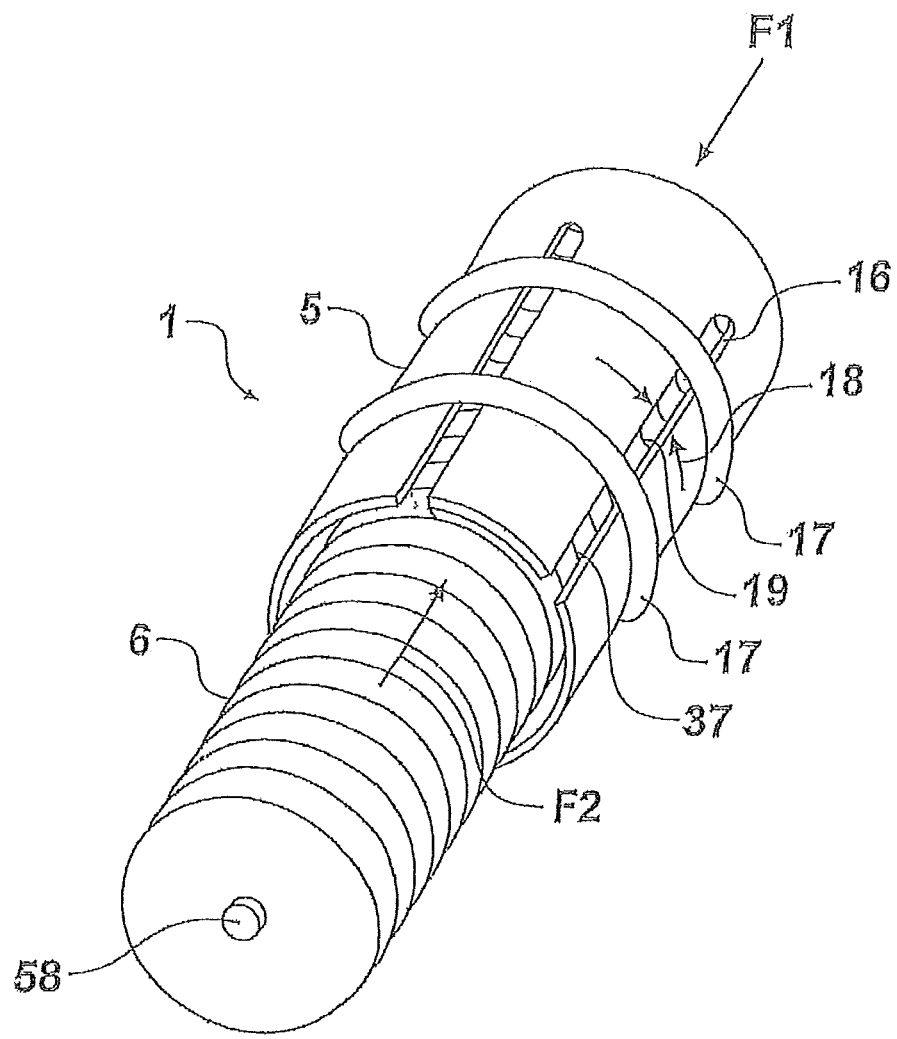

The outer cylinder assembly includes the following components of a cap shaped body member 5, which includes at least one elongated slit 16, with a width or gap 18, at least one exterior circumferential groove 17a, at least one first threaded portion 19 and having a hollow space therein which includes at least one protruding member 22, at least one first biasing means in the form of a first spring member 24, at least one resilient ring member 17.

The cap shaped body member 5 of the outer cylinder assembly has a cylindrical shaped body with a base end 7 which is adapted to receive the external impact force F1, an open end 10, an interior end surface 12, with an exterior length 13, an exterior diameter 14, with an exterior curved side walls 8, with a hollow interior space 9, with an exterior curved wall surface 20, an interior curved wall surface 11 which includes a series of ridges and grooves such as for example, a first threaded portion 19.

The base end 7 of the cap shaped body member 5 has a flat or planar shape to facilitate an easy application of an external impact force F1 on the whole surface.

The cap shaped body member 5 has an exterior length dimension 13 defined from the base end 7 to the open end 10, defining a longitudinal axis 15 of the outer and inner cylinder assemblies or shock absorption device 1. An exterior diameter 14 is oriented at right angles to the longitudinal axis 15 of the shock absorption device 1.

The cap shaped body member 5 of the outer cylinder assembly also includes at least one elongated slit 16, oriented in a longitudinal direction, parallel with the longitudinal axis 15 of the shock absorption device 1. Each elongated slits 16 has a width or gap 18.

At least one resilient ring member 17 is fixed in at least one exterior circumferential groove 17a, on and over the exterior curved wall surface 20, in order to close or reduce the gap 18 of the elongated slits 16, to reduce the exterior diameter 14 of the cap shaped body member 5 and to better hold the outer cylinder assembly to the inner cylinder assembly.

The resilient ring member 17 is provided to outwardly encircle and abut the exterior curved wall surface 20 of the cap shaped body member 5, to provide an elastic movement of itself in order to allow the first threaded portion 19 of the cap shaped body member 5 to jump over the second threaded portion 37 of the cylindrical shaped body member 6 when an external impact force F1 is applied, to allow one way movement or direction only, not in reverse wherein the elongated slit 16 has a longitudinal axis parallel with the longitudinal axis 15 of the shock absorption device 1 and the resilient ring member 17 has an axis in a transverse direction with regard to the longitudinal axis 15 of the shock absorption device 1.

The resilient ring member 17 provides an elastic movement, having spring like characteristics, to enable it to hold and be temporarily stretched or elastically deformable to allow only one way movement of the outer cylinder assembly over the inner cylinder assembly or vice versa, when a certain external impact force F1 is applied, allowing a forward jumping of the first threaded portion 19 over the second threaded portion 37 but not in reverse, because of the 90 degree angle of part of the first threaded portion 19 and the second threaded portion 37, then to return to its original shape to hold the outer cylinder assembly to the inner cylinder assembly.

Each resilient ring member 17 can be shaped to allow holding or clamping to any outside shape of the cap shaped body member 5, such as for example circular in shape with at least one ring (e.g. whatever shape of the exterior curved wall surface 20 of the cap shaped body member 5 can provide) with at least one split, gap, space or means to allow some resilient stretching and restoration.

At least one protruding member 22 is connected or joined to an interior end surface 12 of the cap shaped body member 5 and is oriented in a longitudinal direction, parallel with the longitudinal axis 15 of the inner and outer cylinder assemblies or shock absorption device 1. The protruding member 22 is an elongate shaped body which can have the same length, can be shorter in length or be longer in length than the exterior length 13 of the cap shaped body member 5. For example its distal end called a body end face 70, can be at least recessed with respect to an entry open end 31 of the body of the cylindrical shaped body member 6. In this example the protruding member 22 has a circular cross section.

Figure 2:
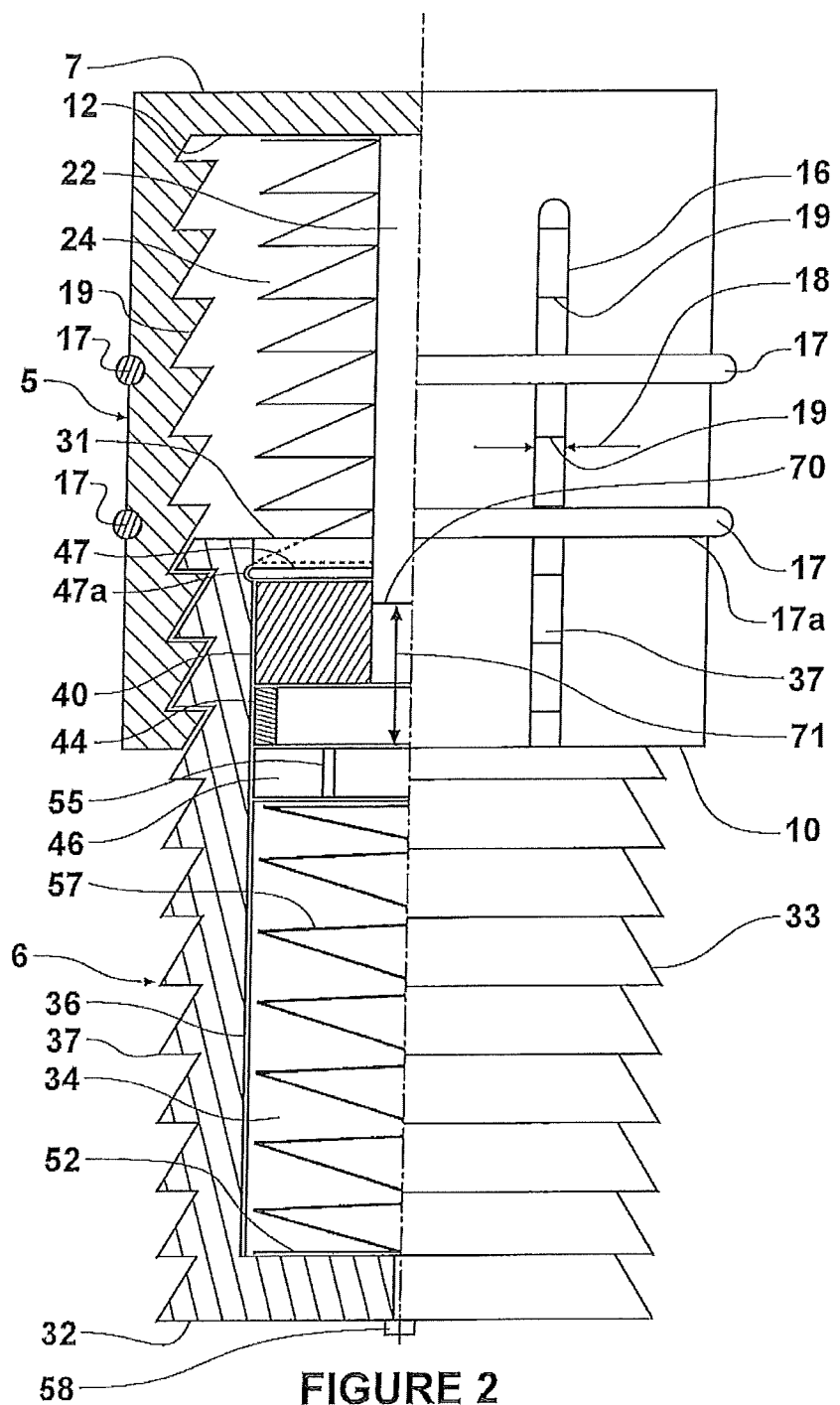
Figure 3:
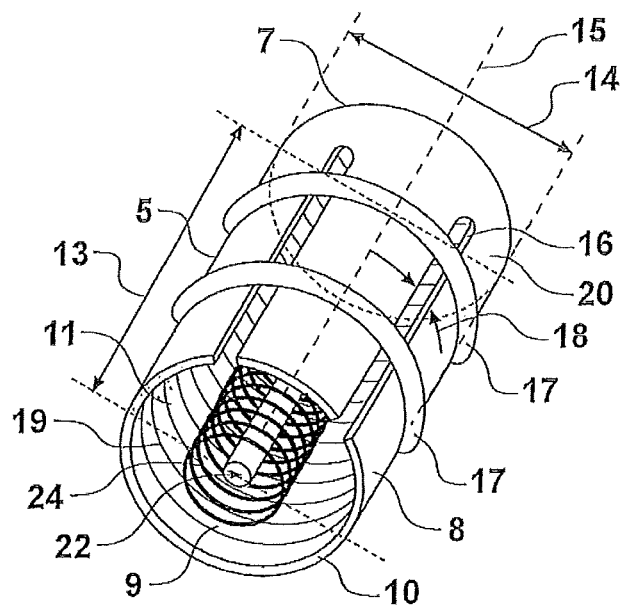
Figure 4:
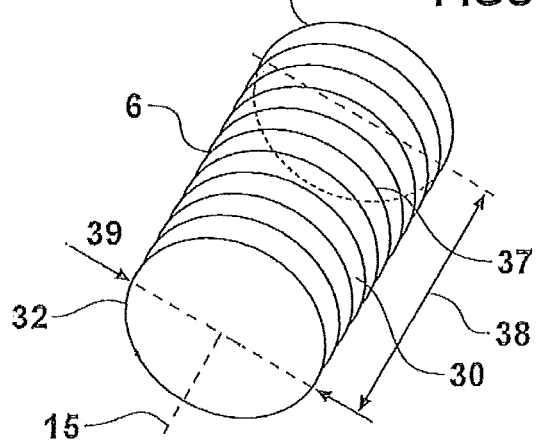
Figure 3A:
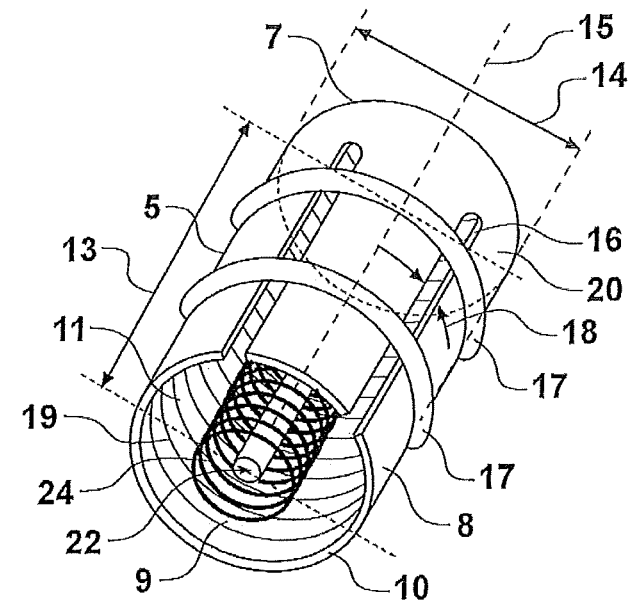
Figure 4A:
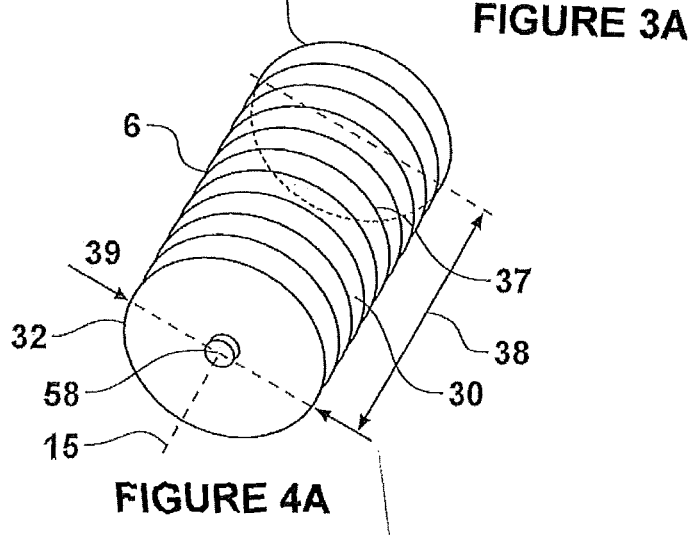
Figure 5:
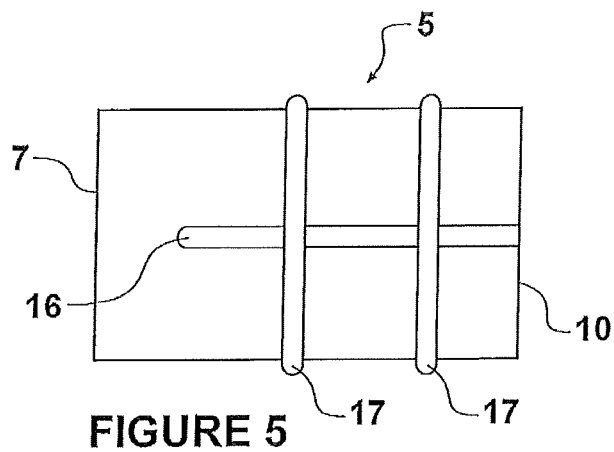
Figure 6:
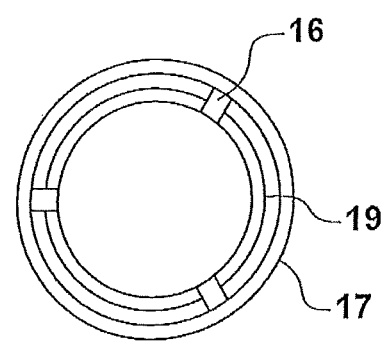

The first biasing means which is in the form of at least one first spring member 24, which in this example is rectangular in shape as seen in FIG. 2, when assembled is located in the hollow interior space 9 of the cap shaped body member 5 and is abutting, connected or joined with the interior end surface 12 and is located on and around an outside (spaced or abutting) of the protruding member 22, which in this example is circular in cross sectional shape as seen in FIG. 2, also is adjacent with an interior end surface 12, with the first threaded portion 19, with the clip member 47 and with the guide member 40.

The Inner Cylinder Assembly

The inner cylinder assembly includes the following components of a cylindrical shaped body member 6 which includes at least one interior circumferential groove 47a, at least one second threaded portion 37 and having a hollow space therein which includes therein, at least one compressive member 56, at least one second biasing means in the form of the second spring member 57, at least one movable piston member 46, at least one spacer ring member 44, at least one guide member 40, at least one clip member 47.

The clip member 47 is located close to or adjacent the open or entrance end 31 followed by underneath and within the hollow space of cylindrical shaped body member 6, those components in an abutting relationship, the guide member 40, then the spacer ring member and then the piston member 46 which then abuts an end of second spring member 57.

The inner cylinder assembly is sized and dimensioned to fit at least within the hollow interior space 9 of the outer cylinder assembly. In this example, the inner cylinder assembly is sized to threadingly fit within the hollow interior space 9 of the outer cylinder assembly and also protrude outwardly thereof.

The cylindrical shaped body member 6 of the inner cylinder assembly has a cylindrical shaped body with an open or entrance (or first end) 31, a base end (or second end) 32, with an exterior length 38, an exterior diameter 39, with an exterior curved side walls 33, with an interior curved wall surface 36, an interior end surface 52, an exterior curved wall surface 30 which includes a series of ridges and grooves such as for example, a second threaded portion 37.

In a first option (as shown in FIGS. 1, 4, 15, 16, 16A, 22, 23, 24, 25, 26) the inner cylinder assembly include a compressive member 56, in the shape of a cylindrical member, formed of a suitable deformable material, which is located within the hollow interior space of the cylindrical shaped body member 6, adjacent with the interior curved wall surface 36, with the interior end surface 52, with the second spring member 57, with the piston member 46 and abutting the inner surfaces of the cylindrical shaped body member 6, with the spacer ring member 44, with the guide member 40 and with the clip member 47. The material for example, is a high performance elastomer polyester (HPEP) material and include a temperature range of −40 F to +120 F, being highly inert to most chemicals and lubricants. The compressive member 56 in the form of a cylindrical high performance elastomer polyester member, can be formed as a substantially solid member or have at least one aperture or recess therein. Second spring member 57 encircles the compressive member 56 ie the compressive member 56 is located within the spring member 57.

Also, another material for the compressive member 56 can be rubber, plastic, or another elastic and compressive material.

Alternatively, in a second option (as shown in FIGS. 1A, 4A, 14, 14A, 17, 18, 19, 20, 21), instead of the compressive member 56 the inner cylinder assembly include the sealed pressure membrane 35, in the shape of a cylindrical member, formed of a pressure resistant material, which is located within the hollow interior space of the cylindrical shaped body member 6, adjacent with the interior curved wall surface 36, with the interior end surface 52, with the second spring member 57, with the piston member 46, with the spacer ring member 44, with the guide member 40 and with the clip member 47. A fluid under pressure can be inserted inside the sealed pressure membrane 35 through the at least one base valve 58 at a certain pressure, wherein the base valve 58 functions is to provide a only one way entry aperture for filling the sealed pressure membrane 35 with the fluid contained, therein.

Alternatively, in the third option (as shown in FIGS. 2, 11, 12, 13), instead of the compressive member 56 the inner cylinder assembly include the sealed pressure chamber 34. The hollow enclosed interior space of the cylindrical shaped body member 6, defines a cylindrical volumetric space as a sealed pressure chamber 34, being a pressurized volume adapted to sealingly retain a fluid under pressure therein adjacent with the interior curved wall surface 36, with the interior end surface 52, with the second spring member 57, with the piston member 46, with the spacer ring member 44, with the guide member 40 and with the clip member 47. The sealed pressure chamber 34 can retain a fluid under pressure directly in the hollow interior space of the cylindrical shaped body member 6, inserted through the at least one base valve 58 at a certain pressure, wherein the base valve 58 functions is to provide a only one way entry aperture for filling the sealed pressure chamber 34 with the fluid contained, therein.

The cylindrical shaped body member 6 includes at least one guide member 40 at its entrance (or in a different position), which is substantially circular in shape to allow sliding engagement within the cylindrically shaped body, and has curved side surface 41 (which can be continuous or not), an outer planar surface 42, an inner planar surface 43, between the outer planar surface 42 and the inner planar surface 43 there is provided with a slot or aperture 45 being provided to slidably guide and locate at least a portion of the protruding member 22, there through. In use, the curved side surface 41 of the guide member 40 slidably abut interior curved wall surface 36 of the cylindrical shaped body member 6.

The cylindrical shaped body member 6 includes at least one spacer ring member 44 which is provided adjacent the guide member 40, and the piston member 46. In this example ring member 44 is located between the guide member 40 and piston member 46.

At least one clip member 47 can be movably located in an interior circumferential groove 47a, which is provided in or near the first end 31 of the cylindrical shaped body member 6, the clip member 47 is also located adjacent with at least one guide member 40. The clip member 47 can be a circlip and functions to removably hold all the components, including the compressive member 56 (or a sealed pressure membrane 35 or the sealed pressure chamber 34), the second spring member 57, the piston member 46, the spacer ring member 44 and the guide member 40 of the inner cylinder assembly. In this example, the clip member 47 is located between an end of first end 31 and the guide member 40. Also the guide member 40 is located between clip member 47 and spacer ring member 44 all being located near the open end 31.

A movable piston member 46 is located adjacent with the guide member 40 and is movably and slidably mounted therein, the piston member 46 being shaped as a disc having a circular cross section, with an outer diameter 48, an outer planar surface 49 separated from an inner planar surface 50 by a thickness dimension 51 and a curved side surfaces 54. In this example, the piston member 46 can be located between the spacer ring member 44 in one side and the second spring member 57 and the compressive member 56, in the first option, or the sealed pressure membrane 35, in the second option, or the sealed pressure chamber 34 in the third option, in another side.

Alternatively, in the third option, when using the sealed pressure chamber 34, at least one piston aperture or hole 53 can be provided there through piston member 46 for the location of at least one piston valve 55 which is designed to allow the fluid to be expelled there through if required, from inside of the sealed pressure chamber 34. In use, the curved side surfaces 54 of the piston member 46 slidably abut the interior curved wall surface 36 of the cylindrical shaped body member 6.

The second biasing means which is in the form of at least one second spring member 57 which in this example is rectangular in shape as seen in FIG. 2, when assembled is located in the hollow interior space of the cylindrical shaped body member 6, adjacent with the piston member 46, with the compressive member 56 (in the first option), with the interior end surface 52, with the interior curved wall surface 36.

Alternatively, the second spring member 57 is adjacent also with the base valve 58, in the second option, when using the sealed pressure membrane 35 or in the third option, when using the sealed pressure chamber 34.

The second spring member 57 functions to hold or position the piston member 46 and is positioned to extend in its relaxed position from an inner planar surface 50 of the piston member 46 to an interior end surface 52.

Alternatively, in the second option, when using the sealed pressure membrane 35 or in the third option, when using the sealed pressure chamber 34, one base valve 58 can be positioned adjacent with the base end 32 and the interior end surface 52 of the cylindrical shaped body member 6, having an aperture there through which is designed to allow the fluid to be one way inputted only into the sealed pressure membrane 35 or the sealed pressure chamber 34.

Alternatively, in the third option, when using a sealed pressure chamber 34, the piston member 46 needs to have a low tolerance in terms of size and shape in order to maintain the pressure of the fluid tightness inside the sealed pressure chamber 34. For a good tight pressure of the sealed pressure chamber 34, the outer planar surface 49 of the piston member 46 and piston valves 55 can be coated or laminated with a flexible resilient membrane 69. The coating or lamination can be done with resilient materials such as for example silicone or rubber.

Due to the decreased volume of the sealed pressure chamber 34 during the action of the external impact force F1, at least some of the fluid under pressure will be discharged through the piston valves 55, whereby the piston valves 55 are designed to allow a sufficient flow of pressurized or compressed fluid from the sealed pressure chamber 34 combined with the relaxation or deformation of the second spring member 57, until F2=F1.

The fluid from inside the sealed pressure membrane 35 or a sealed pressure chamber 34, has a certain pressure which can be calculated according to the external impact force F1.

Depending on the magnitude of the external impact force F1 we can calculate the dimensions (the volume, the diameter, the length, etc.) of the compressive member 56, in the first option, or of the sealed pressure membrane 35 in the second option, or of the sealed pressure chamber 34, on the third option. Also, depending on the magnitude of the external impact force F1, we can calculate the dimensions for the first spring member 24, the second spring member 57, the first threaded portion 19, and the second threaded portion 37.

Shock Absorption Device 1 Operation

The shock absorption device 1 is in a non-active position, when the first spring member 24, the second spring member 57 and the compressive member 56, in the first option (or the sealed pressure membrane 35, in the second option or the fluid under pressure from the sealed pressure chamber 34, in the third option) are in a relaxed position (i.e. non-compressed), when the outer cylinder assembly and the inner cylinder assembly minimally overlap.

Figure 25:
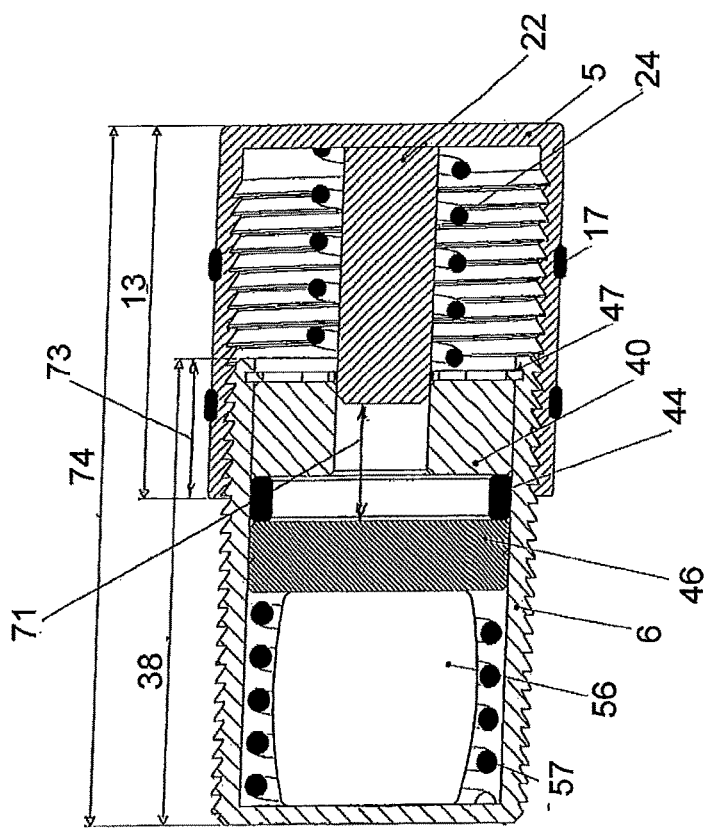
Figure 24:
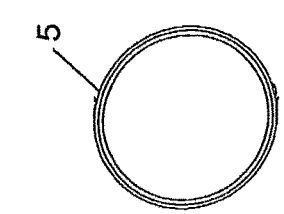
Figure 23:
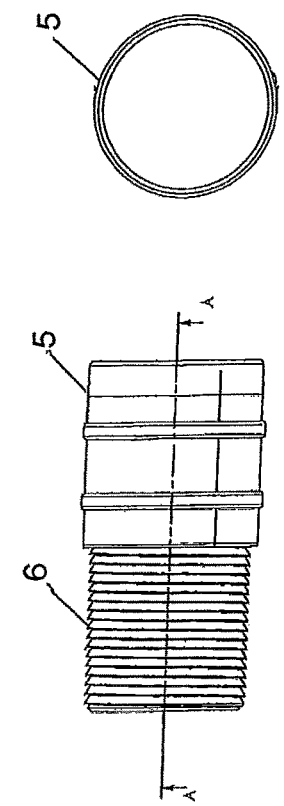

In the first option, when using the compressive member 56, as shown in the FIG. 25, or in the second option, when using the sealed pressure membrane 35, as shown in the FIG. 20, the pre-use orientation of the inner cylinder assembly with respect to the outer cylinder assembly, whereby the first threaded portion 19 of the cap shaped body member 5 is screwed by only a small portion of its entire threaded extent in a small portion of the second threaded portion 37 of the cylindrical shaped body member 6 (eg an overlap portion 73 and an overall length 74), so that at least a portion of the protruding member 22 is going through the aperture 45 of the guide member 40 and an end of the first spring member 24 is located on the outer planar surface 42 of the guide member 40.

When the protruding member 22 is in place there is a distance 71, between the body end face 70 of the protruding member 22 and the outer planar surface 49 of the piston member 46.

When an external impact force F1 is applied, the guide member 40 allows the protruding member 22 to move through with the set or calculated distance 71, before hitting the piston member 46. If the external impact force F1 is low or the distance 71 is not used up, the shock absorption device 1 will not be activated.

The shock absorption device 1 can be said to be in a non-activated position, when there is a distance 71 between the body end face 70 of the protruding member 22 and the outer planar surface 49 of the piston member 46.

The shock absorption device 1 can be said to be in an activated position, when the body end face 70 of the protruding member 22 pushes the outer surface 49 of the piston member 46.

The first threaded portion 19 and the second threaded portion 37 are shaped and oriented to have a forward angled degree angle and a further forward 90 degree angle as shown in FIG. 2, with the resilient ring members 17, whereby initial movement between the outer cylinder assembly and the inner cylinder assembly 6 is the only one way elastic movement, whereby the external impact force F1 pushes the outer cylinder assembly, to cause the first threaded portion 19 of the cap shaped body member 5 of the outer cylinder assembly to jump over the second threaded portion 37 of the cylindrical shaped body member 6 of the inner cylinder assembly.

When the reactive force F2 will equalize the external impact force F1 (F2=F1), the shock absorption device 1 will be locked in a random position whereby the outer cylinder assembly and the inner cylinder assembly are not able to disengage with respect to each other because of the only one way meshing of the first threaded portion 19 with the second threaded portion 37, when the external force F1 is being applied, which only allows one way directional movement by elastic jumping of the two threaded portions (19 and 37) to cause compression of the first spring member 24, of the second spring member 57 and of the compressive member 56, in the first option (or the sealed pressure membrane 35, in the second option, or the sealed pressure chamber 34, in the third option). When (F2=F1) the outer cylinder assembly and the inner cylinder assembly are locked in place The first threaded portion 19 and the second threaded portion 37 are formed in such way that the shock absorption device 1 will stop and not automatically return to its original position (i.e. only one way directional movement of the inner cylinder assembly with respect to the outer cylinder assembly or vice versa). However, by simply unscrewing the outer cylinder assembly and the inner cylinder assembly, the shock absorption device 1 (i.e. the outer with respect to the inner cylinder assemblies) will be back to its original state in order to be able to reuse it.

The absorption of the external impact force F1 occurs in such a way that the shock absorption device 1 is locked in a random position, when F2=F1.

When the external impact force F1 is applied on the surface of the base end 7 of the cap shaped body member 5 of the outer cylinder assembly, the second spring member 57, and the compressive member 56 (or a sealed pressure membrane 35 or a sealed pressure chamber 34) will be compressed to a certain point and then it will relax in order to push back the piston member 46 and therefore to help increasing the reactive force F2, until F1=F2.

A method of assembly of the shock absorption device 1 for a structure includes the following steps:

Step 1—Evaluate and calculate an external impact force F1 wherein the external impact force F1 can be calculated depending on the speed of the vehicle, on the weight of the vehicle, etc.;

Step 2—In the first option, when using the compressive member 56, the fluid pressure does not exist;

Step 2.1—Alternatively, in the second option, when using the sealed pressure membrane 35, calculate the pressure of the fluid from inside the sealed pressure membrane 35, according to the external impact force F1;

Step 2.2—Alternatively, in the third option, when using the sealed pressure chamber 34, calculate the pressure of the fluid from the sealed pressure chamber 34 according to the external impact force F1;

Step 3—In the first option, when using a compressive member 56, calculate the dimensions of the compressive member 56, according to the external impact force F1;

Step 3.1—Alternatively, in the second option, when using a sealed pressure membrane 35, calculate the dimensions of the sealed pressure membrane 35, according to the external impact force F1;

Step 3.2—Alternatively, in the third option, when using a sealed pressure chamber 34, calculate the dimensions of the sealed pressure chamber 34, according to the external impact force F1;

Step 4—Calculate the dimensions of the first spring member 24 and the second spring member 57, according to the external impact force F1;

Step 5—Calculate the dimensions of the first threaded portion 19 and the second threaded portion 37, according to the external impact force F1;

Step 6—Form and provide the outer cylinder assembly, which includes a cap shaped body member 5 consisting of at least one elongated slit 16, at least one exterior circumferential groove 17a, a first threaded portion 19 and a protruding member 22, a first spring member 24 at least one resilient ring member 17;

Step 7—Assemble the outer cylinder assembly: inside the cap shaped body member 5 fix the protruding member 22, add the first spring member 24 located around the protruding member 22 and add the resilient ring member 17 in the exterior circumferential groove 17a located outside the cap shaped body member 5 on the exterior curved wall surface 20;

Step 8—In the first option, when using a compressive member 56, form and provide the inner cylinder assembly, which includes a cylindrical shaped body member 6 consisting of a second threaded portion 37, an interior circumferential groove 47a and a guide member 40, a spacer ring member 44, a piston member 46, a second spring member 57, a clip member 47, a compressive member 56;

Step 8.1—Alternatively, in the second option, when using a sealed pressure membrane 35, form and provide the inner cylinder assembly, which includes a cylindrical shaped body member 6 consisting of a second threaded portion 37, an opening for the base valve 58, an interior circumferential groove 47a and a guide member 40, a spacer ring member 44, a piston member 46, a second spring member 57, a clip member 47, a sealed pressure membrane 35;

Step 8.2—Alternatively, in the third option, when using a sealed pressure chamber 34, form and provide the inner cylinder assembly, which includes a cylindrical shaped body member 6 consisting of a second threaded portion 37, an opening for the base valve 58 and an interior circumferential groove 47a, a guide member 40, a spacer ring member 44, a piston member 46, a second spring member 57, a clip member 47, a sealed pressure chamber 34;

Step 9—In the first option, when using a compressive member 56, assemble the inner cylinder assembly: inside the cylindrical shape body member 6 add the second spring member 57, add the compressive member 56 adjacent with the second spring member 57;

Step 9.1—Alternatively, in the second option, when using a sealed pressure membrane 35, assemble the inner cylinder assembly: inside the cylindrical shape body member 6 add the second spring member 57, add the sealed pressure membrane 35 and fix the base valve 58 to the base end 32 of the cylindrical shaped body member 6;

Step 9.2—Alternatively, in the third option, when using a sealed pressure chamber 34, assemble the inner cylinder assembly: inside the cylindrical shape body member 6 add the second spring member 57, add the sealed pressure chamber and fix the base valve 58 to the base end 32 of the cylindrical shaped body member 6;

Step 10—Next add the piston member 46;

Step 11—Alternatively, in the third option, when using a sealed pressure chamber 34, optionally seal, laminate or coat the whole piston member outside surface 49, including the surface of the piston valves 55 with a flexible resilient membrane 69;

Step 12—Add the spacer ring member 44, then add the guide member 40 and finally add the clip member 47 in the interior circumferential groove 47a;

Step 13—In the first option, when using the compressive member 56 there are no fluid under pressure and no base valve 58

Step 13.1—Alternatively, in the second option, when using the sealed pressure membrane 35 or in the third option, when using the sealed pressure chamber 34, insert the fluid inside the sealed pressure membrane 35 or inside the sealed pressure chamber 34 through the base valve 58 at a certain pressure, calculated at Step 2;

Step 14—Assemble the shock absorption device 1 to be ready for mounting: screw a small portion of the first threaded portion 19 of the outer cylinder assembly to a small portion of the second threaded portion 37 of the inner cylinder assembly, so that at least a portion of the protruding member 22 is going through the aperture 45 of the guide member 40 and an end of the first spring member 24 is located on the outer planar surface 42 of the guide member 40 to be in an non activated position, with a certain overlap portion 73 between the outer cylinder assembly and the inner cylinder assembly, then mount the shock absorption device 1 on any place (surface) of the vehicle;

Step 15—The shock absorption device 1 is ready for use by being in a non-activated position, whereby the external force F1 can be applied.

A method of utilizing a shock absorption device 1 for a structure includes the following steps:

Step 1—The shock absorption device 1 is first assembled in a non-activated position, when there is a set distance 71 between the body end face 70 of the protruding member 22 and the piston member 46, with a certain overlap 73 between the outer cylinder assembly and the inner cylinder assembly;

Step 2—An external impact force F1 is applied to the surface of the base end 7 of the cap shaped body member 5 of the outer cylinder assembly;

Step 3—The first threaded portion 19 jumps over the second threaded portion 37 and the protruding member 22 moves through the aperture 45 of the guide member 40, until the distance 71 between the body end face 70 of the protruding member 22 and the outer planar surface 49 of the piston member 46 is closed;

Step 4—In the first option, when using the compressive member, further, because of the application of the external impact force F1, the body end face 70 of the protruding member 22 pushes the outer planar surface 49 of the piston member 46 that pushes and compresses the second spring member 57 and the compressive member 56;

Step 4.1—Alternatively, in the second option, when using the sealed pressure membrane 35, or in the third option, when using the sealed pressure chamber, because of the application of the external impact force F1, the body end face 70 of the protruding member 22 pushes the outer planar surface 49 of the piston member 46 that pushes and compresses the second spring member 57 and the fluid under pressure from the sealed pressure membrane 35 or from the sealed pressure chamber 34, Step 5—In the first option, when using the compressive member 56, the second spring member 57 and the compressive member 56 will relax and together will provide a reactive force F2;

Step 5.1—Alternatively, in the second option, when using a sealed pressure membrane 35, the second spring member 57 and the compressed fluid under pressure from the sealed pressure membrane 35 will relax and together will provide a reactive force F2;

Step 5.2—Alternatively, in the third option, when using a sealed pressure chamber 34, the second spring member 57 and the compressed fluid under pressure from the sealed pressure chamber 34 will relax and together will provide a reactive force F2, while the fluid under pressure from the sealed pressure chamber 34 will be evacuated or discharged through the piston valves 55;

Step 6—The reactive force F2 will increase and will push back the piston member 46 and also the protruding member 22 and the first spring member 24;

Step 7—When the reactive force F2 equalizes the external impact force F1 (F2=F1), the shock absorption device 1 will be locked in a certain position;

Step 8—By simply unscrewing the outer cylinder assembly and the inner cylinder assembly, the shock absorption device 1 will return to its original position or non-activated position, in order to be reused.

Some Advantages of the Present Invention

Portable
Modest cost
Functional simplicity
Reliable operation
Able to be re-used
Able to be retrofitted
Simple construction
Simple to manufacture
Can be made to any size
Reduces forces of any impact
Can be calibrated to any size force
Has a single one way action of movement of the inner and outer cylinder assemblies
Able to be used in many situations and on many objects
Able to be fitted to or be including in new constructions The Shock Absorption Device 1 has the following parts or components:

5. Cap shaped body member of the Outer cylinder assembly
6. Cylindrical shaped body member of the Inner cylinder assembly
7. Base end of 5
8. Exterior curved side walls of 5
9. Hollow interior space of 5
10. Open end of 5
11. Interior curved wall surface of 5
12. Interior end surface of 5
13. Exterior length of 5
14. Exterior diameter of 5
15. Longitudinal axis of the device 1
16. Elongated slit
17. Resilient ring member
17a. Exterior circumferential groove
18. Width/Gap of 16 (of 5)
19. First threaded portion
20. Exterior curved wall surface of 5
22. Protruding member
24. First biasing means as a first spring member
30. Exterior curved wall surface of 6
31. Open end of 6
32. Base end of 6
33. Exterior curved side walls of 6
34. Sealed pressure chamber
35. Sealed pressure membrane
36. Interior curved wall surface of 6
37. Second threaded portion
38. Exterior length of 6
39. Exterior diameter of 6
40. Guide member
41. Curved side surface of 40
42. Outer planar surface of 40
43. Inner planar surface of 40
44. Spacer ring member
45. Aperture of 40
46. Piston member
47. Clip member
47a. Interior circumferential groove
48. Outer diameter of 46
49. Outer planar surface of 46
50. Inner planar surface of 46
52. Interior end surface of 6
53. Aperture of 46
54. Curved side surface of 46
55. Piston valves
56. Compressive member
57. Second biasing means as a second spring member
58. Base valve
60. Head portion
62. Shaft portion
63. Head top face
64. Distal end
65. Nut
66. Third spring member
67. Washer
69. Flexible resilient membrane
70. Body end face of 22
71. Distance between 22 and 46
73. Overlap portion
74. Overall length F1—external impact force
F2—reactive force Variations Throughout the description of this specification, the word "comprise" and variations of that word such as "comprising" and "comprises", are not intended to exclude other additives, components, integers or steps.

The use of 'inner' and 'outer' are relative terms and can be swapped depending of what use is required. The inner surface of the cap shaped body 5 and outer surface of the cylindrical shaped body member 6 need to be curved or circular or be substantially similar to allow the body 5 and member 6 to be threadingly engageable. The outer surface of body 5 can be formed of any shape. The inner surface of member 6 can be of any shape as long as the components can be inserted therein.

Though the cap shaped body member 5 and the cylindrical shaped body member 6 are shown as being circular in cross section, other shapes are possible as long as they can threadably engage with each other or at least provide interlocking surfaces with other surfaces not necessarily being the same. The dimensions and shape of the shock absorption device 1 and its components can be varied to suit the type of the object which needs to be protected from an impact and the size of possible impact.

The size, shape and number of the biasing means including the first spring member 24 and the second spring member 57 can also be varied or selected from helical springs, compression springs, extension springs, leaf springs, flat springs, torsion springs, helical extension springs, helical coil springs, conical coil springs and hydraulic springs.

The first spring member 24 can be joined or connected to the interior end surface 12 of the cap shaped body member 5. The second spring member 57 can be located adjacent with the compressive member 56 (or the sealed pressure membrane 35, or a sealed pressure chamber 34), with the interior curved wall surface 36, with the interior end surface 52 and with the inner planar surface 50 of the piston member 46.

The cap shaped body member 5 of the outer cylinder assembly can have an outer hexagonal shape to facilitate the unscrewing process with respect to the cylindrical shaped body member Additionally or alternatively the cap shaped body member 5 can have holes for assisting in unscrewing.

The base end 7 of the cap shaped body member 5 of the outer cylinder assembly is shown having a non-rounded outer end surface with means to allow driving or rotatably adjusting, though other shapes are also possible such as for example a rounded end with ribs or apertures.

Figure 14:
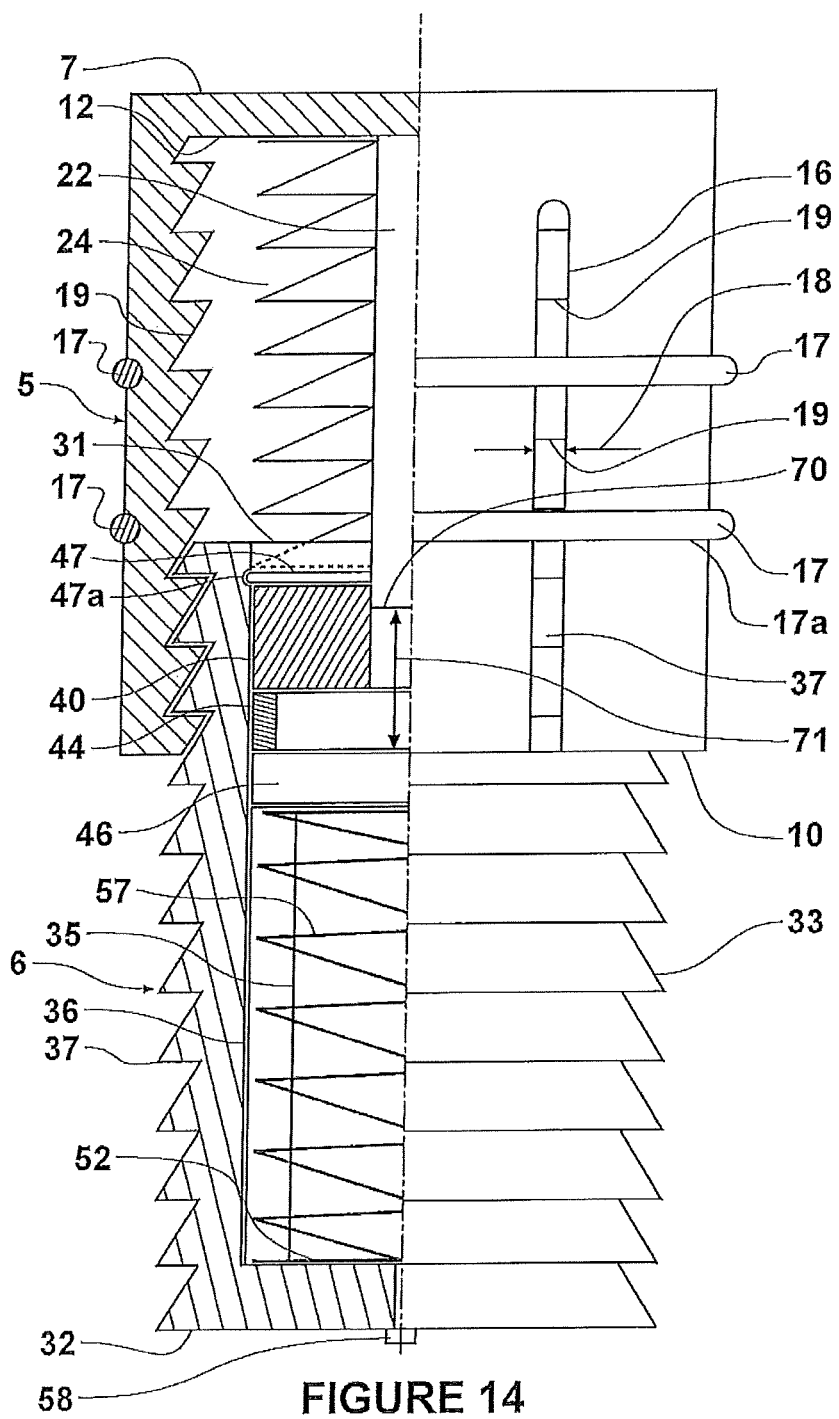
Figure 14A:
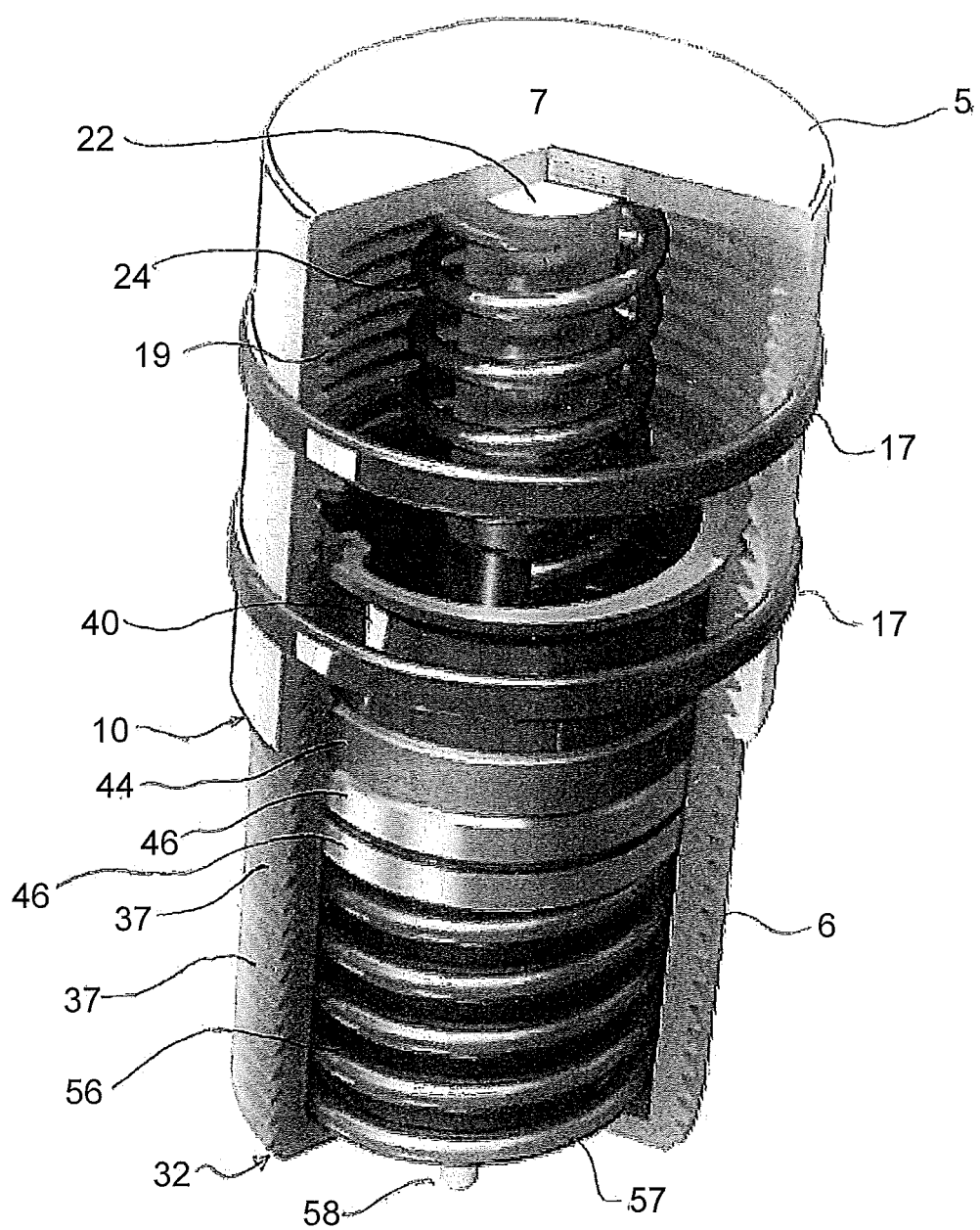
Figure 15:
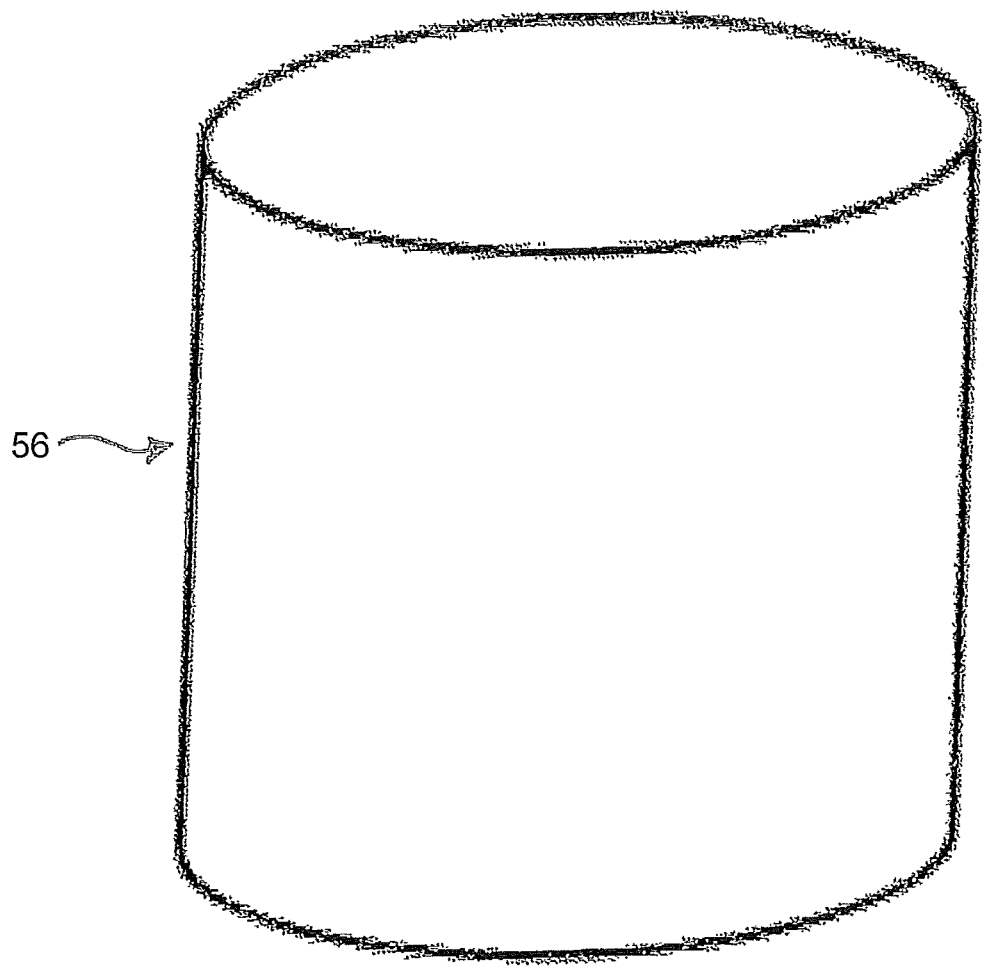
Figure 16:
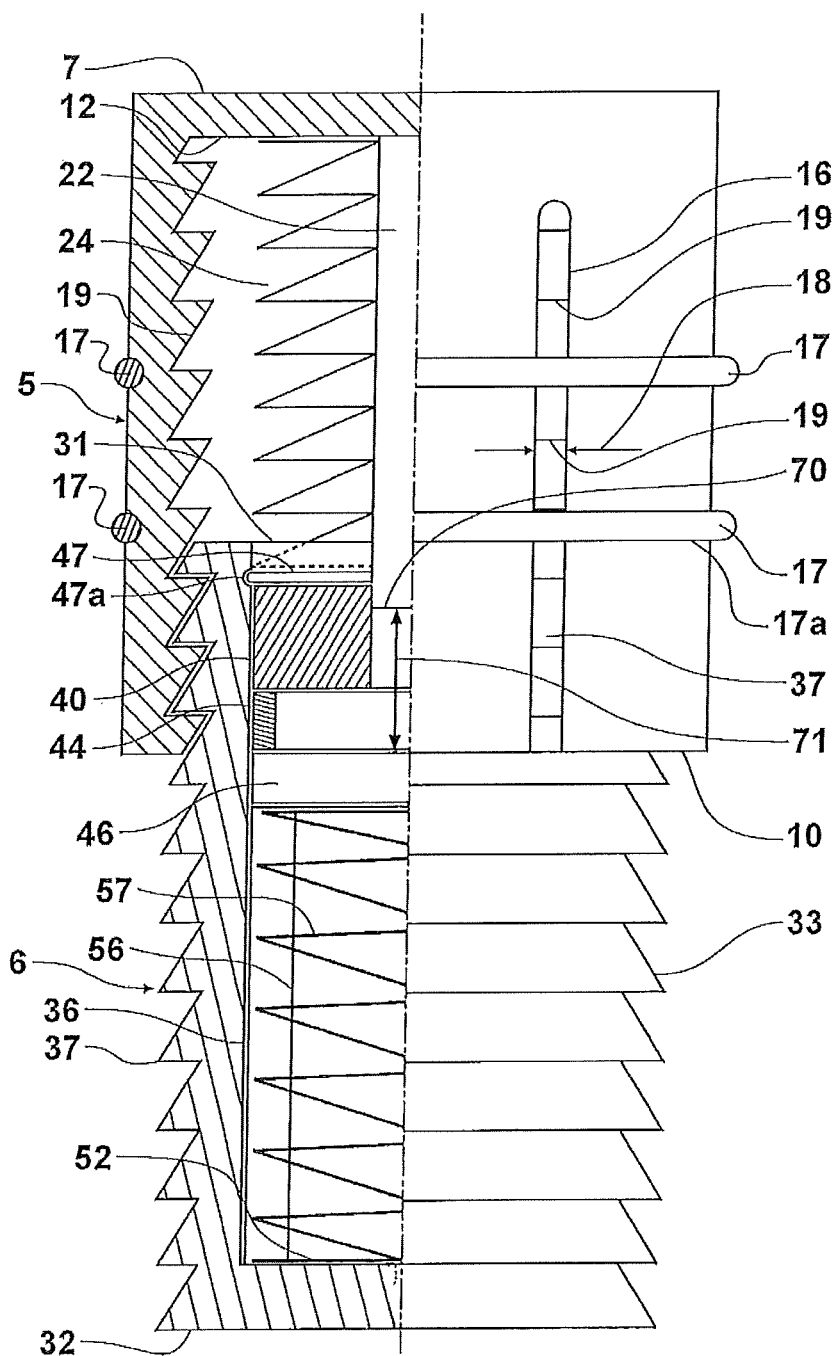
Figure 16A:
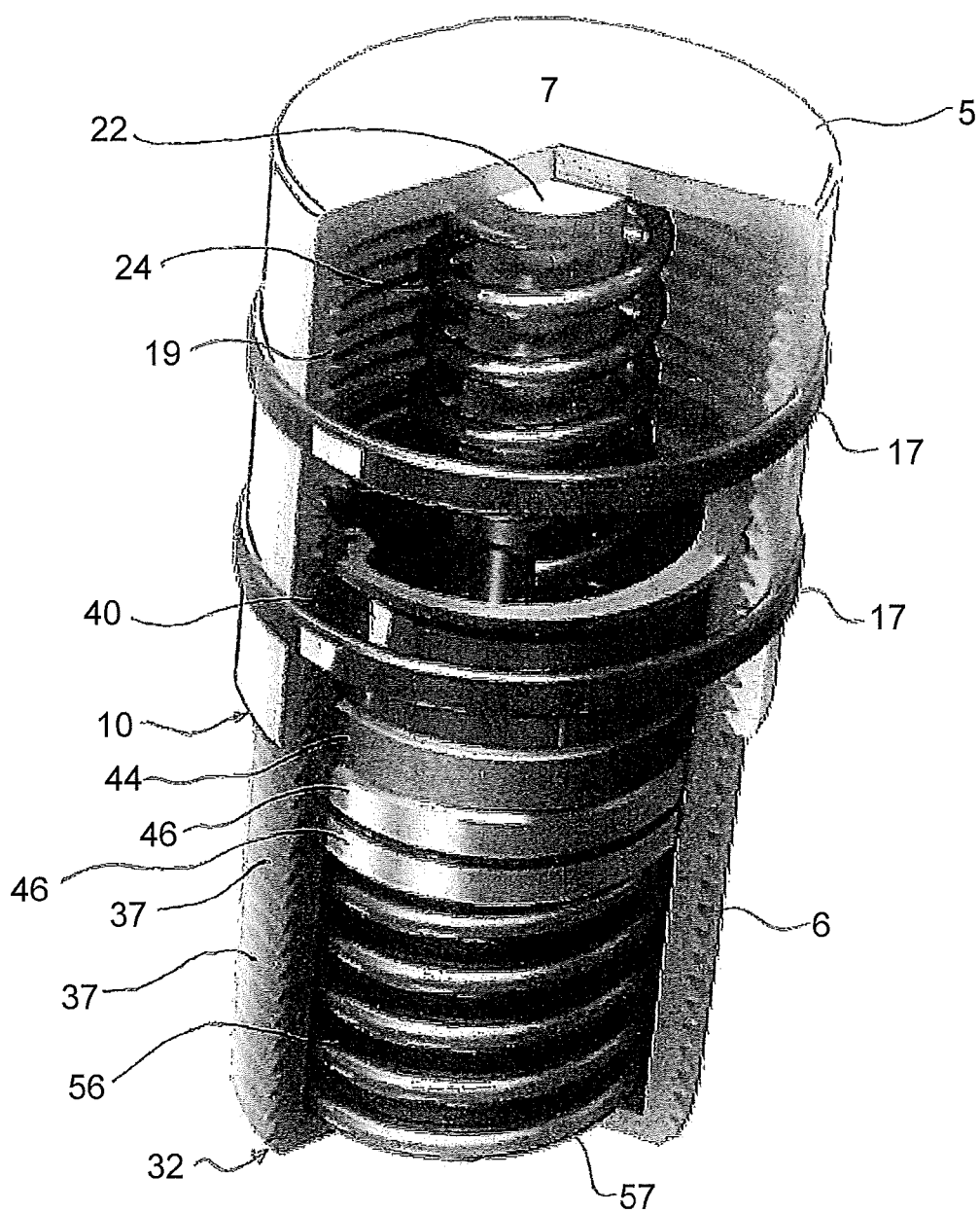
Figure 26:
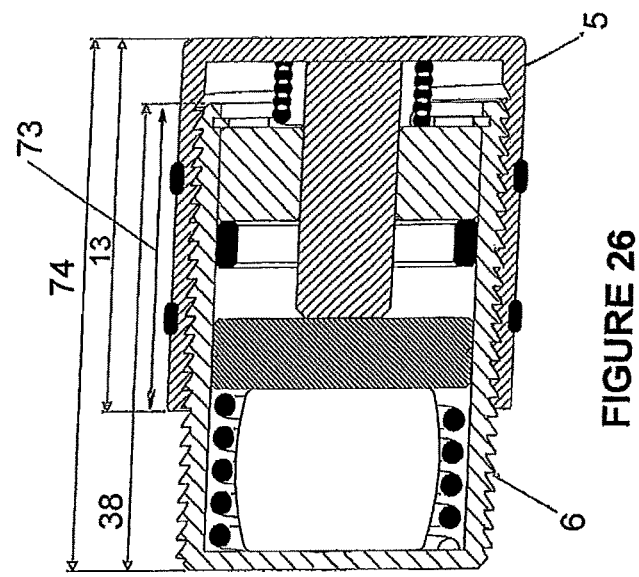
Figure 22:
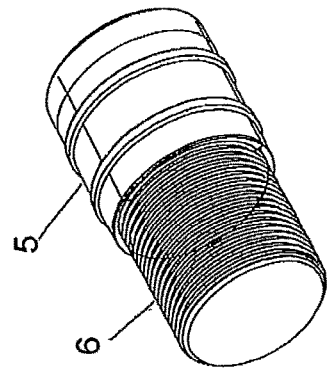

The resilient ring member 17 is shown as being one ring but equally more rings or other forms of resilient means like a spring can also be used of any suitable material. FIGS. 1, 1A, 2, 3, 3A, 5, 14 and 16 show the ring member as a circular cross section but equally other cross sections are possible such as, as shown in FIGS. 14A and 16A where there is a rectangular cross section.

Yet other options include the use of acoustic and optical sensing systems.

The protruding member 22 is shown as being circular in cross section but equally other shapes are also possible. The aperture 45 of the guide member 40 would be shaped to match or at least allow the protruding member 22 there through and be guided.

The protruding member 22 can be formed integrally or joined or connected to the interior end surface 12 of the cap shaped body member 5. The shape and the cross section can also be varied like for example it can be round or solid or circular or hollow or be adjustable. The first threaded portion 19 and the second threaded portion 37 can have other shapes or at least have intermeshing ridges and grooves.

Figure 7:
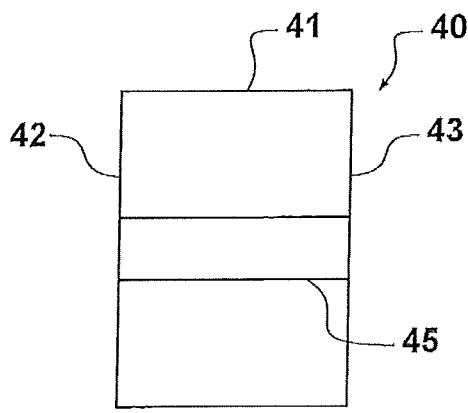
Figure 8:
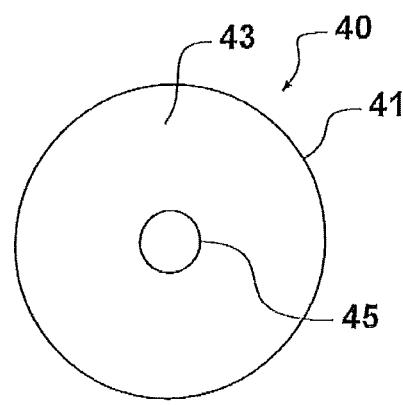

The guide member 40 as shown in FIG. 7 having a non-curved inner planar surface 43 but equally other shapes are possible such as a curved inner planar surface 43 with the slot 45 therein.

Figure 9:
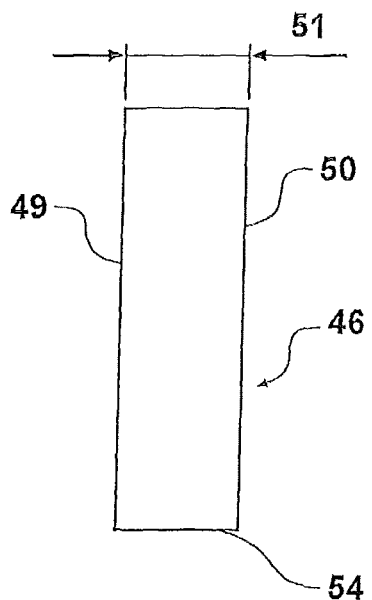
Figure 10:
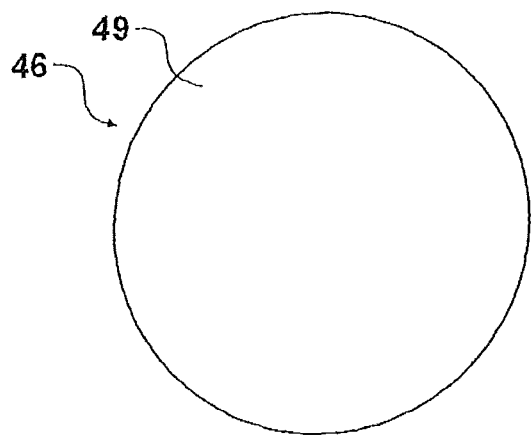

In the first option, when using the compressive member 56 or in the second option, when using the sealed pressure membrane 35, the piston member 46 can be formed as a hollow or solid member, as shown in FIG. 9.

In the third option, when using the sealed pressure chamber 34, the piston member 46 can be formed as a solid member with at least one aperture or hole 53 is provided there through for the location of a piston valve 55 which is designed to allow the fluid to be expelled there through if required, from inside of the sealed pressure chamber 34.

In the first option, when using the compressive member 56 or in the second option, when using the sealed pressure membrane 35, the piston member 46 comprises a circular solid shaped disc member, as shown in FIG. 9.

Figure 11:
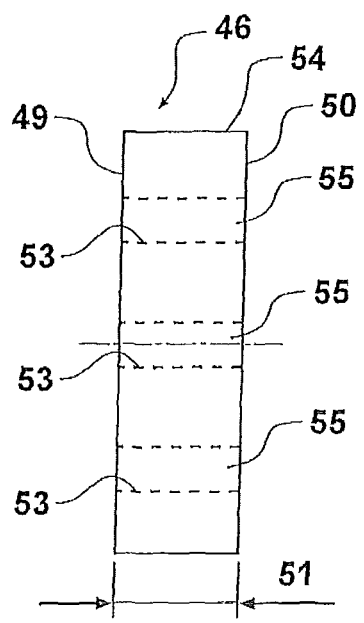
Figure 12:
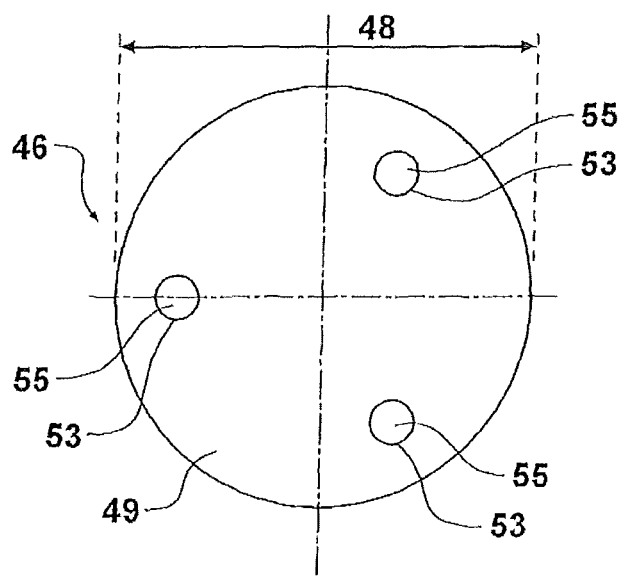
Figure 13:
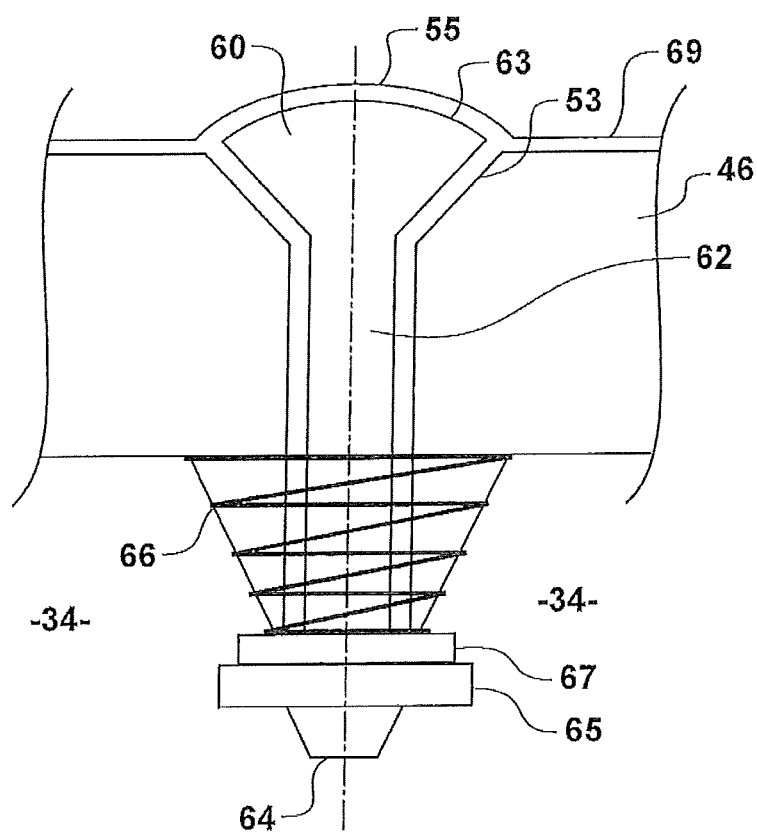

In the third option, when using the sealed pressure chamber 34, the piston member 46, as shown in FIG. 11, comprises a circular shaped disc member with at least one aperture 53 there through for at least one piston valve 55 therein, wherein the piston valve 55 functions is to provide an exit of any excess fluid pressure from within the sealed pressure chamber 34.

The piston valve 55 also includes a head portion 60 and a shaft portion 62. The head portion 60 comprises a flared head end with a rounded head top face 63. A top portion of the aperture in piston member 46 is also flared to complement the head shape of the piston valve 55. The shaft portion 62 is adapted to protrude through the piston member 46 to extend into the sealed pressure chamber 34 and includes an elongate cylindrical body with a distal end 64 and an outer curved surface with a portion including a threaded surface with a locking nut 65 threadably engaged.

A conically shaped third spring member 66 is located on the outer surface between an inner surface of the piston member 46 and an inner surface of a washer 67. A washer 67 can also be positioned between the end of the third spring 66 and the nut 65.

The piston valves 55 can be calibrated valves composed with at least one flat or oval head portion 60 of a bolt or screws, with at least one conically shaped third spring member 66, with at least one washer 67 and at least one nut 65. The nut 65 is used to adjust the gas set pressure from the sealed pressure chamber 34. The bolts or screws are inserted through the piston holes 53 in order to move and allow the enclosed fluid to be evacuated when the reactive force F2 will increase.

In the first option, when using the compressive member 56 there is no fluid with a constant pressure inside the inner cylinder assembly and the cylindrical shaped body member 6 of the inner cylinder assembly has no valves.

In the second option, when using the sealed pressure membrane 35, the fluid under pressure is inside the sealed pressure membrane 35 of the inner cylinder assembly and the cylindrical shaped body member 6 of the inner cylinder assembly includes at least one base valve 58 which is connected with the sealed pressure membrane 35, the base valve 58 is positioned between an end wall or base end 32 and the inner end surface 52, wherein the base valve 58 functions is to provide a one way entry aperture for filling the sealed pressure membrane 35 with the fluid contained, therein.

In the third option, the cylindrical shaped body member 6 has a hollow enclosed interior space inside, therein the hollow enclosed interior space defines a cylindrical volumetric space or sealed pressure chamber 34, bordered by an interior curved wall surface 36 being a pressurized volume adapted to retain a fluid under pressure therein. In order to maintain a constant pressure of the fluid inside the sealed pressure chamber 34, the outer planar surface 49 of the piston member 46 including the piston valves 55 (the outer surface 63 of the valve head 60), are coated or laminated with a flexible resilient membrane 69, the coating or lamination can be done with resilient materials such as for example silicone or rubber. When using the sealed pressure chamber 34, the piston member 46 of the cylindrical shaped body member 6 of the inner cylinder assembly includes at least one base valve 58 which is located and positioned in an end wall or base end 32 wherein the base valve 58 functions is to provide a one way entry aperture for filling the sealed pressure chamber 34 with the fluid contained, therein.

The fluid under pressure from the sealed pressure membrane 35 or from the sealed pressure chamber 34 can be air, inert gas, nitrogen, etc.

The outer surfaces of the clip member 47, guide member 40, spacer ring member 44 and piston member 46 can be continuous or be gapped or intermittent as long as each is able to slidably inter-fit within the cylindrically shaped body 6 and perform its own particular function.

The overlap portion 73 can be any set distance including nothing to something depending on space and loading.

It will also be understood that where a product, method or process as herein described or claimed and that is sold incomplete, as individual components, or as a "kit of Parts", that such exploitation will fall within the ambit of the invention. The shock Absorption device 1 (the outer cylinder assembly and the inner cylinder assembly) can be mounted (by bolting, screwing, welding, etc.) to any substrate or surface of the vehicle.

These and other features and characteristics of the present invention, as well as the method of operation and functions of the related elements of structures and the combination of parts and economics of manufacture, will become more apparent upon consideration of the following description with reference to the accompanying drawings, all of which form part of this specification, wherein like reference numerals designate corresponding parts in the various figures.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

For purposes of the description hereinafter, the terms "upper", "lower", "right", "left", "vertical", "horizontal", "top", "bottom", "lateral", "longitudinal", "side", "front", "rear" and derivatives thereof shall relate to the invention as it is oriented in the drawing figures. However it is to be understood that the invention may assume various alternative variations, except where expressly specified to the contrary. It is also to be understood that the specific devices illustrated in the attached drawings, and described in the following specification are simply exemplary embodiments of the invention. Hence specific dimensions and other physical characteristics related to the embodiments disclosed herein are not to be considered as limiting.

It will of course be realised that while the foregoing has been given by way of illustrative example of this invention, all such and other modifications and variations thereto as would be apparent to persons skilled in the art are deemed to fall within the broad scope and ambit of this invention as is hereinbefore described.

What I claim is:

1. A shock absorption device 1 for a surrounding or abutting structure which includes an outer cylinder assembly and an inner cylinder assembly, the outer cylinder assembly includes a cap shaped body member 5 which includes at least one elongated slit 16, with at least one width or gap 18, at least one exterior circumferential groove 17a, at least one first threaded portion 19 and having a hollow space therein which includes at least one protruding member 22, at least one first spring member 24, at least one resilient ring member 17 which is provided to outwardly encircle an exterior curved wall surface 20 of the cap shaped body member 5, the inner cylinder assembly includes a cylindrical shaped body member 6 which includes at least one second threaded portion 37 and having a hollow space therein which includes at least one compressive member 56, at least one second spring member 57, at least one movable piston member 46, the inner cylinder assembly is threadably engaged within the outer cylinder assembly whereby the first threaded portion 19 threadably engages with the second threaded portion 37, wherein when an external impact force F1 is applied to the cap shaped body member 5, the first threaded portion 19 jumps over the second threaded portion 37 as provided by elastic movement of the resilient ring member 17 about the cap shaped body member 5 which allows the first threaded portion 19 of the cap shaped body member 5 to jump over the second threaded portion 37 of the cylindrical shaped body member 6 when an external impact force F1 is applied, to allow one way movement only, the first spring member 24 is compressed, the protruding member 22 pushes the piston member 46, the piston member 46 pushes and compresses the second spring member 57 and the compressive member 56 which when relaxed are providing a reactive force F2 to cause the absorption of the external impact force F1 in such a way that the shock absorption device 1 is locked in a random position when F2=F1, whereby the outer cylinder assembly and the inner cylinder assembly are not able to disengage with respect to each other.

2. The shock absorption device as claimed in claim 1 wherein, the cap shaped body member 5 of the outer cylinder assembly has a cylindrical body shape with a base end 7, an open end 10, a hollow interior space 9, an exterior length 13, an exterior diameter 14, an interior end surface 12, an exterior curved side walls 8, an exterior curved wall surface 20 and an interior curved wall surface 11 having the first threaded portion 19 located therein.

3. The shock absorption device as claimed in claim 2 wherein, the cylindrical shaped body member 6 of the inner cylinder assembly has a cylindrical body shape with a base end 32, an open end 31, an exterior length 38, an exterior diameter 39, an interior end surface 52, an exterior curved side walls 33, an interior curved wall surface 36 and an exterior curved wall surface 30 having the second threaded portion 37 there around.

4. The shock absorption device as claimed in claim 3 wherein, the at least one resilient ring member 17 is located in an at least one exterior circumferential groove 17a in the exterior curved wall surface 20 of cap shaped body member 5 and wherein the elongated slit 16 has a longitudinal axis parallel with a longitudinal axis 15 defining a length of the shock absorption device 1 and the resilient ring member 17 has an axis in a transverse direction defining a width, with regard to the longitudinal axis 15 of the shock absorption device 1.

5. The shock absorption device as claimed in claim 4 wherein, the protruding member 22 and the first spring member 24 are located adjacent each other, inside the hollow interior space 9 of the cap shaped body member 5, the protruding member 22 extends through the open end 10 of the cap shaped body member 5 and protrude parallel with the longitudinal axis 15 of the shock absorption device 1, the protruding member 22 includes a body with the same length, shorter in length or longer in length with respect to the length of the cap shaped body member 5 wherein a distal end called a body end face 70 of the protruding member 22 is recessed with respect to an entry open end 31 of the cylindrical shaped body member 6.

6. The shock absorption device as claimed in claim 5 wherein, in a first option, the compressive member 56 is a cylindrical high performance elastomer polyester (HPEP) member.

7. The shock absorption device as claimed in claim 5 wherein, in a second option, the compressive member 56 can be replaced with a sealed pressure chamber 35.

8. The shock absorption device as claimed in claim 5 wherein, in a third option, the compressive member 56 can be replaced with a sealed pressure membrane 34.

9. The shock absorption device as claimed in claim 6 wherein, in the first option, the compressive member 56 is located inside the hollow interior space of the cylindrical shaped body member 6, adjacent with the second spring member 57, with an inner planar surface 50 of the piston member 46, with the interior curved wall surface 36 and with an interior end surface 52 of the cylindrical shaped body member 6.

10. The shock absorption device as claimed in claim 7 wherein, in the second option, the sealed pressure membrane 35 is located inside the hollow interior space of the cylindrical shaped body member 6, adjacent with the second spring member 57, with an inner planar surface 50 of the piston member 46, with the interior curved wall surface 36 and an interior end surface 52 of the cylindrical shaped body member 6.

11. The shock absorption device as claimed in claim 8 wherein, in the third option, the cylindrical shaped body member 6 has a hollow enclosed interior space inside, therein the hollow enclosed interior space defines a cylindrical volumetric space or sealed pressure chamber 34, located adjacent with the second spring member 57, with the inner planar surface 50 of the piston member 46, with the interior curved wall surface 36 and with the interior end surface 52 of the cylindrical shaped body member 6.

12. The shock absorption device as claimed in claim 9 wherein, in the first option, when using the compressive member 56, the cylindrical shaped body member 6 of the inner cylinder assembly includes at least one interior circumferential groove 47a, for the removable location of a spacer ring member 44.

13. The shock absorption device as claimed in claim 10 wherein, in the second option, when using the sealed pressure membrane 35 or in the third option, when using the sealed pressure chamber 34, the cylindrical shaped body member 6 of the inner cylinder assembly includes at least one interior circumferential groove 47a, the at least one second threaded portion 37 and at least one base valve 58.

14. The shock absorption device as claimed in claim 5 wherein, the inner cylinder assembly includes the following components of at least one guide member 40, located adjacent with the first spring member 24, with at least one clip member 47, with at least one spacer ring member 44, with at least one piston member 46 wherein the guide member 40 is provided with a body with a curved side surfaces 41, an outer planar surface 42, an inner planar surface 43, with at least one aperture 45 extended from the outer planar surface 42 to the inner planar surface 43 defining a thickness, the curved side surfaces 41 of the guide member 40 are in use slidably abutting the interior curved wall surface 36 of the cylindrical shaped body member 6, wherein when in use the guide member 40 allows to at least a portion of the protruding member 22 there through, wherein the protruding member 22 moves within a certain distance 71 before hitting the piston member 46 and if the external impact force F1 is too low, the device will not be activated to cause movement between the outer and inner cylinder assemblies.

15. The shock absorption device as claimed in claim 14 wherein, the at least one spacer ring member 44, is located between the guide member 40, with the piston member 46, which are located adjacent the protruding member 22 at the open end 31 of the cylinder shaped member 6.

16. The shock absorption device as claimed in claim 15 wherein, the at least one piston member 46, located between the spacer ring member 44 and the second spring member 57, and the second spring member 57 encircles the compressive member 56, wherein the piston member 46 is provided with a body with a curved side surface 54, an outer planar surface 49, an inner planar surface 50, wherein in the first option, when using the compressive member 56, the piston member 46 comprises a circular solid shaped disc member.

17. The shock absorption device as claimed in claim 16 wherein the guide member 40 is located between the at least one clip member 47 and at least one spacer ring member 44.

18. The shock absorption device as claimed in claim 13 wherein, in the second option, when using the sealed pressure membrane 35, the piston member 46 comprises a circular solid shaped disc member and the second spring member is located outside of the sealed pressure membrane 35.

19. The shock absorption device as claimed in claim 11 wherein, in the third option, when using a sealed pressure chamber 34, the piston member 46 comprises a circular shaped disc member with at least one aperture 53 there through for at least one piston valve 55 therein, wherein the piston valve 55 when in use functions is to provide an exit of any excess fluid pressure from within the sealed pressure chamber 34.

20. The shock absorption device as claimed in claim 17 wherein, at least one clip member 47 is movably located in the at least one interior circumferential groove 47a which is provided inside the first end 31 of the cylindrical shaped body member 6, the clip member 47 is located adjacent with the guide member 40, with the first spring member 24, with the protruding member 22, wherein the clip member 47 can be a circlip and functions to removably hold all the components, which can include the compressive member 56, the second spring member 57, the piston member 46, the spacer ring member 44 and the guide member 40 of the inner cylinder assembly.

21. The shock absorption device as claimed in claim 20 wherein, at least one second spring member 57 is movably located adjacent with the compressive member 56, with the piston member 46, wherein the second spring member 57 functions is to hold or position the piston member 46 of the inner cylinder assembly, wherein the second spring member 57 is positioned to abut the base interior end surface 52 of the cylindrical shaped body member 6 and an inner planar surface 50 of the piston member 46, wherein the second spring member 57 together with the compressive member 56 assist in increasing the reactive force F2.

22. The shock absorption device as claimed in claim 21 wherein, the first spring member 24 and the second spring member 57 are rectangular or circular in cross section.

23. The shock absorption device as claimed in claim 22 wherein, in the first option, when using the compressive member 56, the piston member 46 comprises a circular solid shaped disc member with no apertures, sized and shaped to slidably interfit inside the cylindrical shaped body member 6, the piston member 46 having an outer planar surface 49, an inner planar surface 50 and a curved side surface 54 wherein in use, the curved side surface 54 of the piston member 46 slidably abuts the interior curved wall surface 36 of the cylindrical shaped body member 6.

24. The shock absorption device as claimed in claim 18 wherein, in the second option, when using the sealed pressure membrane 35, the piston member 46 comprises a circular solid shaped disc member with no apertures.

25. The shock absorption device as claimed in claim 19 wherein, in the third option, when using the sealed pressure chamber 34, the piston member 46 has a circular shaped disc member with at least one aperture 53 there through for at least one piston valve 55 therein, wherein the piston valve 55 functions is to provide an exit of any excess fluid pressure from within the sealed pressure chamber 34.

26. The shock absorption device as claimed in claim 23 wherein, in the first option, when using the compressive member 56 there is no fluid under pressure inside the inner cylinder assembly and the cylindrical shaped body member 6 of the inner cylinder assembly has no inlet or outlet or base valves.

27. The shock absorption device as claimed in claim 24 wherein, in the second option, when using the sealed pressure membrane 35, the fluid under pressure is inside the sealed pressure membrane 35 of the inner cylinder assembly and the cylindrical shaped body member 6 of the inner cylinder assembly includes at least one base valve 58 which is connected with the sealed pressure membrane 35, the base valve 58 is positioned between an end wall or base end 32 and the inner end surface 52, wherein the base valve 58 functions is to provide a one way entry aperture for filling the sealed pressure membrane 35 with the fluid contained, therein.

28. The shock absorption device as claimed in claim 25 wherein, in the third option, the cylindrical shaped body member 6 has a hollow enclosed interior space inside, therein the hollow enclosed interior space defines a cylindrical volumetric space or sealed pressure chamber 34, bordered by an interior curved wall surface 36 being a pressurized volume adapted to retain a fluid under pressure therein, for a constant pressure of the fluid inside the sealed pressure chamber 34, the outer planar surface 49 of the piston member 46 including the piston valves 55 (the outer surface 63 of the valve head 60), are coated or laminated with a flexible resilient membrane 69, the coating or lamination can be done with resilient materials such as for example silicone or rubber. When using the sealed pressure chamber 34, the piston member 46 of the cylindrical shaped body member 6 of the inner cylinder assembly includes at least one base valve 58 which is located and positioned in an end wall or base end 32 wherein the base valve 58 functions is to provide a one way entry aperture for filling the sealed pressure chamber 34 with the fluid contained, therein.

29. The shock absorption device as claimed in claim 26 wherein, the first threaded portion 19 and the second threaded portion 37 are shaped and oriented to have a forward angled degree angle and a further forward 90 degree angle as shown in FIG. 2, with the resilient ring member 17 and the elongated slits 16, whereby initial movement between the outer cylinder assembly and the inner cylinder assembly is the only one way elastic movement, whereby the external impact force F1 pushes the cap shaped body member 5 of the outer cylinder assembly, to cause the first threaded portion 19 to jump over the second threaded portion 37 of the cylindrical shaped body member 6 of the inner cylinder assembly.

30. The shock absorption device as claimed in claim 29 wherein, the length of the cylindrical shaped body member 6 of the inner cylinder assembly is longer than the length of the cap shaped body member 5 of the outer cylinder assembly, having an exterior length 38 commensurate with a longitudinal axis 15 of the shock absorption device 1 and an exterior diameter 39, also having a transverse axis located at right angles to the longitudinal axis 15 of the shock absorption device 1.

31. The shock absorption device as claimed in claim 30 wherein, the outer cylinder assembly can be threadingly engaged or disengaged with respect to the inner cylinder assembly to create an overlap length 74 there between the first threaded portion 19 and the second threaded portion 37, wherein the shock absorption device 1 is ready for use when there is a certain distance 71 between the protruding member 22 and the piston member 46.

32. The shock absorption device as claimed in claim 31 wherein the inner surface shape of the cap shaped body member 5 and outer surface of the cylindrical shaped body member 6 are similar thereby enabling them to be threadingly engagable.

* * * * *